US010976157B2

(12) United States Patent
Redenius

(10) Patent No.: US 10,976,157 B2
(45) Date of Patent: Apr. 13, 2021

(54) APPARATUS AND RELATED METHODS OF MEASURING BREAST CUP SIZE FOR GARMENTS THAT SUPPORT BREAST

(71) Applicant: Ron Redenius, Citrus Heights, CA (US)

(72) Inventor: Ron Redenius, Citrus Heights, CA (US)

(*) Notice: Subject to any disclaimer, the term of this patent is extended or adjusted under 35 U.S.C. 154(b) by 623 days.

(21) Appl. No.: 15/796,617

(22) Filed: Oct. 27, 2017

(65) Prior Publication Data

US 2018/0209786 A1 Jul. 26, 2018

Related U.S. Application Data

(60) Provisional application No. 62/510,696, filed on May 24, 2017, provisional application No. 62/470,105, filed on Mar. 10, 2017, provisional application No. 62/414,607, filed on Oct. 28, 2016.

(51) Int. Cl.
| | |
|---|---|
| *G01B 11/28* | (2006.01) |
| *A41H 1/02* | (2006.01) |
| *G01B 11/02* | (2006.01) |
| *G01B 11/00* | (2006.01) |

(52) U.S. Cl.
CPC ............ *G01B 11/285* (2013.01); *A41H 1/02* (2013.01); *G01B 11/00* (2013.01); *G01B 11/02* (2013.01)

(58) Field of Classification Search
CPC ......... A41H 1/02; G01B 11/02; G01B 11/285
See application file for complete search history.

(56) References Cited

U.S. PATENT DOCUMENTS

| | | |
|---|---|---|
| 2,527,206 A | 10/1950 | Amyot |
| 2,575,343 A | 11/1951 | Heiman |
| D295,150 S | 4/1988 | Farrell |
| D348,226 S | 6/1994 | Alaniz |
| 5,477,241 A | 12/1995 | Higgins et al. |
| 5,485,855 A | 1/1996 | Whiraiwa et al. |
| 5,539,677 A | 7/1996 | Smith |
| 5,913,686 A | 6/1999 | VanWinkle |
| 6,276,069 B1 | 8/2001 | Chadwick et al. |
| 8,655,053 B1 | 2/2014 | Hansen |
| 8,832,955 B2 | 9/2014 | Petter et al. |
| 2009/0287119 A1 | 11/2009 | Chapman |
| 2017/0024898 A1 | 1/2017 | Spector et al. |

OTHER PUBLICATIONS

Beverly Johnson; "Four Ways of Measuring"; https://www.braandcorsetsupplies.com/2015/03/07/four-ways-of-measuring/; Mar. 7, 2015 (Year: 2015).*
MyBraSizeCalculator; "Find Your True Bra Size"; https://mybrasizecalculator.com/; Dec. 18, 2014 (Year: 2014).*
JasminesBridalShop; "Measurement Guide for Bridal Tops"; https://jasminesbridalshop.com/measurement-guide-for-bridal-tops; Feb. 26, 2015 (Year: 2015).*

* cited by examiner

*Primary Examiner* — Janet L Suglo
(74) *Attorney, Agent, or Firm* — Buche & Associates, P.C.; John K. Buche; Bryce A. Johnson

(57) ABSTRACT

Disclosed is apparatus and related methods of measuring breast cup size for garments that support breasts.

1 Claim, 30 Drawing Sheets

APPARATUS AND RELATED METHODS OF MEASURING BREAST CUP SIZE FOR GARMENTS THAT SUPPORT BREAST

CROSS-REFERENCE TO RELATED APPLICATIONS

This application claims the priority benefit of U.S. Pat. App. Ser. Nos. 62/414,607 (filed Oct. 28, 2016), 62/470,105 (filed Mar. 10, 2017) and 62/510,696 (filed May 24, 2017) entitled "Apparatus and related methods of measuring breast cup size for garments that support breasts" which patent applications are hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of devices and methods of do-it-yourself measuring of breast cup size for the purposes of fitting bras, brassieres, bralettes, swim tops and other garments that support breasts or any garment at all. The disclosed subject matter can also generally be fit in the field of methods of do-it-yourself measuring of dimensions.

Further Background of the Invention

Garments exist that support the breasts of the wearer. Such breast-support garments are typified by bras, brassieres, bralettes, or swim tops. An important chore of fitting breast-support garments to a wearer is determining the wearer's band width (i.e., the circumference of the wearer's torso taken directly underneath the breasts) and cup size (i.e., the volume of the wearer's breast) because a poorly fitted breast support garment can be unaesthetic and cause back or neck pain.

Cup size is a more difficult measurement to take than band width (but both measurements are neither easy nor simple). Determining the band width of a wearer is relatively simple because the task only requires the collection of a single dimension. Basically, a tape measure can be wrapped around the torso of the wearer and pulled comfortably taut just beneath the wearer's breast to collect wearer's band width (but even this simple task is frequently flubbed because the tape measure is pulled too tight or improperly aligned). Determining the cup size, by contrast, is difficult because the task involves the collection of multiple dimensions of the breast from a single origin where the origin is hard to keep steady given the fluidity of breasts. On top of that, calculations of cup size based on the measured dimensions are complex. So, basic tools, like a measuring tape, have to this point in time been tedious or inaccurate for determining cup size.

Elaborate breast cup measuring devices have been invented given the difficulties of cup size measurement identified above. For instance: U.S. Pub. Pat. App. No. 2009/0287119 (published Nov. 19, 2009) discloses a "breast volume measurement device and system" that involves the trial-and-error unfurling of partial spheroids of predetermined volume around a breast until one fits. Elaborate breast cup measuring devices are neither (a) practical for personal ownership nor (b) kept on-hand by everyman because cup size measurement is not a quotidian. So, elaborate breast cup measuring devices or techniques can only usually be found at the point-of-sale of a breast support garment.

Given the current state of the art, online or impromptu shopping for breast support garments can be difficult. Online shoppers are faced with either (a) measuring his or her cup size with an inaccurate measurement device, like a tape measure, or (b) visiting a point-of-sale breast support garment store beforehand to have sizes determined. Neither of these options are ideal because online shoppers are faced with the difficult task of trying to measure themselves with devices they may not have or are used to using. Furthermore, even when such devices are used it is difficult to interpret the results. So, a need exists for breast measuring devices that are accurate, practical for personal ownership, capable of being readily kept on-hand, and that interpret measurements automatically.

SUMMARY OF THE INVENTION

In view of the foregoing, an object of this specification is to disclose apparatus and related methods of measuring breast cup size for garments that support breasts. Another objective of this disclosure is to describe breast measuring devices that are accurate, practical for personal ownership, and capable of being readily kept on-hand. It is the objective to disclose an everyman device and related method of measuring breast cup size. Finally, it is an objective of this document to describe apparatus and related methods of measuring breast cup size or torso circumference (i.e., bra band).

While not everyone has measuring tapes or elaborate measuring devices on-hand, most people in modern societies carry cellular phones or other mobile multi-media devices. Therefore, in one embodiment, the device comprises a hand-held computer display (including "cell phones) coupled to computer hardware, where the hardware features software configured to (a) display a first chart for obtaining a first dimension of the breast in z-axis, (b) display an input prompt and receive thereby the first dimension, (c) display a second chart for obtaining a second dimension in the positive x axis, (d) display an input prompt and receive thereby the second dimension, (e) an optional third chart for obtaining a dimension in the negative x-axis, (f) optionally display an input prompt and receive thereby a dimension, (g) calculate a breast cup size correlated to the first, second, and optional third dimensions, and (f) presenting the calculated breast cup size on the hand-held computer display. The software could also be configured to display charts for determining the +Y or optionally −Y dimension of a breast and include the same dimension in the calculation of a breast cup size. In other embodiments, the charts are presented on non-computer devices, like print-outs on paper, stone, wood planks, or the like.

In one mode of operation, the user: (1) places the hand-held computer display adjacent to a breast to observe the first dimension while the first chart is displayed; (2) inputs the first dimension into the input prompt; (3) places the hand-held computer display adjacent to a breast to observe the second dimension while the second chart is displayed; (4) inputs the second dimension into the input prompt; (5) places the hand-held computer display adjacent to a breast to observe the third dimension while the second chart is displayed; and, (6) observes the breast cup size on the hand-held computer display.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 53 being positioned by a woman under her breast so that the a dimension of the breast may be observed by the woman, where the dimension is the distance between the side of her rib cage and the side of her breast; and, FIG. 55 is an environmental front view of the cellphone or other portable multimedia device with a GUI being positioned by a woman against her side so that the a dimension of the torso may be observed by the woman, where the dimension is the distance between the front edge of the side of her rib cage and the front edge of the side of her rib cage.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Figure 1:
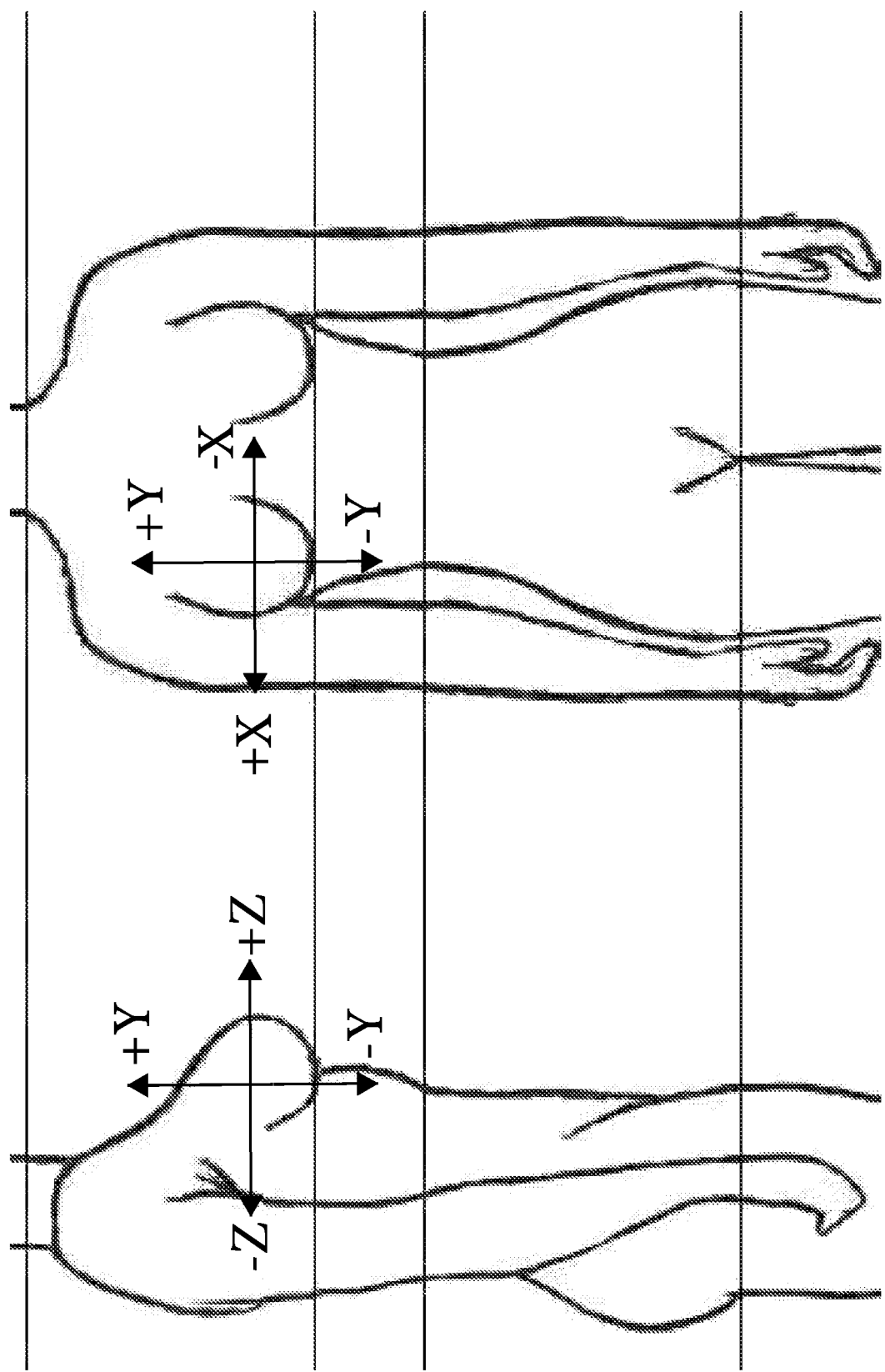
FIG. 1 is a line-up of a woman's breasts that illustrates the +X, −X, +Y, −Y, +Z or −Z dimensions of a breast.

FIG. 1 is a line-up of a woman's breasts that illustrates the +X, −X, +Y, −Y, +Z and −Z dimensions of a breast. The left side of the figure shows a profile of a woman's breast with a Y-Z coordinate chart superimposed there over. The right side of the figure shows a front view of a woman's breast with an X-Y coordinate chart superimposed there over. The figure is presented to give context to the dimensions of a woman's breast discussed below in connection with the determination of breast cup size. As shown, the +X dimension is in an outward right direction, the −X direction is an inward left direction, the +Y dimension is an upward direction, the −Y dimension is a downward direction, and the +Z dimension is a forward direction.

Figure 2:
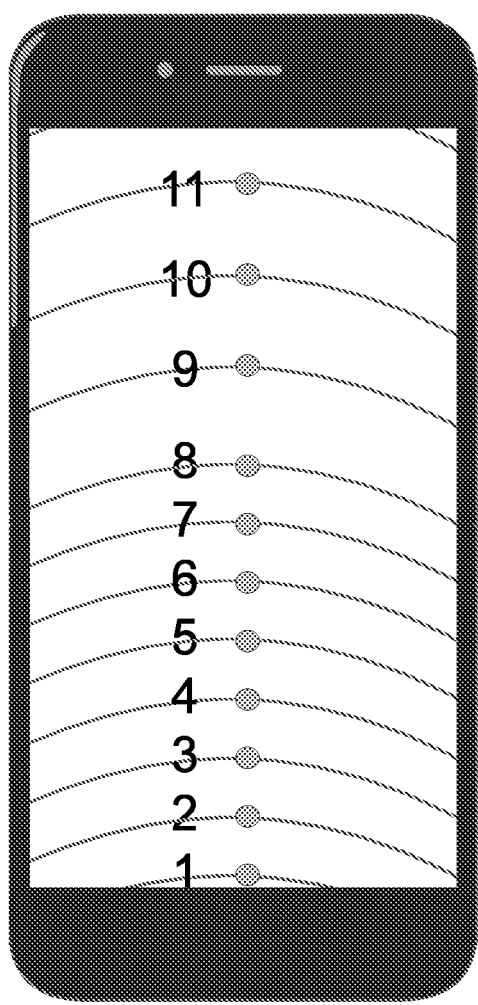
FIG. 2 is an image of a cellphone or other portable multimedia device with a graphical user interface (GUI) displaying a chart for measuring the +Z dimension of a woman's breast.
Figure 3:
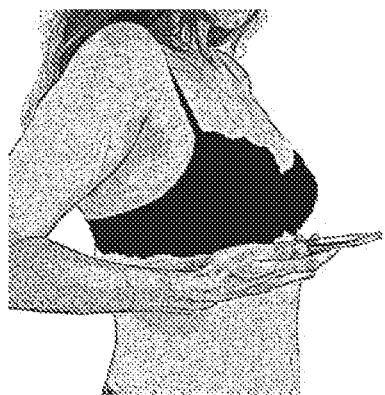
FIG. 3 is an environmental side view of the cellphone or other portable multimedia device with a GUI of FIG. 2 being positioned by a woman under her breast so that the +Z dimension of the breast may be observed by the woman.
Figure 4:
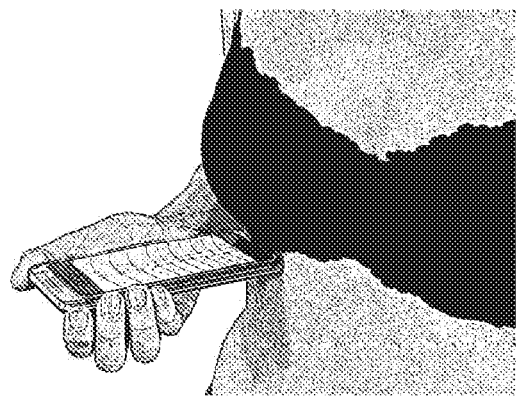
FIG. 4 is an environmental perspective view of the cellphone or other portable multimedia device with a GUI of FIG. 2 being positioned by a woman under her breast so that the +Z dimension of the breast may be observed by the woman.

FIG. 2 is an image of a cellphone or other portable multimedia device with a graphical user interface (GUI) displaying a chart for measuring the +Z dimension of a woman's breast. In one embodiment, the GUI is stored in a database and delivered to the device for presentation of the display. The App can be a third party app or a web browser. FIG. 3 is an environmental side view of the cellphone or other portable multimedia device with a GUI of FIG. 2 being positioned by a woman under her breast so that the +Z dimension of the breast may be observed by the woman. Suitably, the woman views her breasts over the device and observes the dimension, which is defined by the graduation to which the breast extends over the phone. FIG. 4 is an environmental perspective view of the cellphone or other portable multimedia device with a GUI of FIG. 2 being positioned by a woman under her breast so that the +Z dimension of the breast may be observed by the woman. Once the +Z dimension is observed, a prompt on the display of the device may receive an input of the dimension. A user may either input the dimension immediately or write the dimension down for later input. Suitably, the computer hardware and/or software of the device can store the dimension in a database or other similar computer component under the direction of software so that the dimension may be later recalled for inclusion in an algorithm for determining a breast cup size based on +X, −X, and +Z dimensions. It should be noted that database can be referring to any available memory where dimension information can be stored for later lookup to be used in calculations, including a lookup table.

Figure 5:
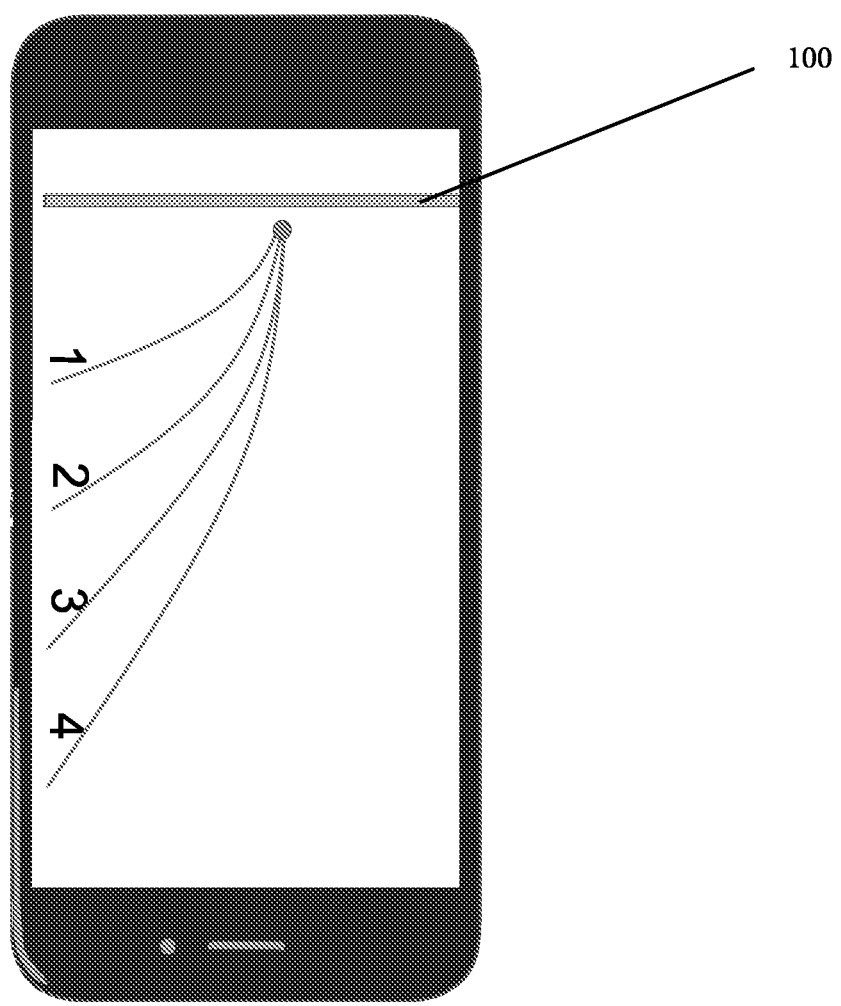
FIG. 5 is an image of a cellphone or other portable multimedia device with a GUI displaying a chart for measuring the +X dimension of a woman's breast.
Figure 6:
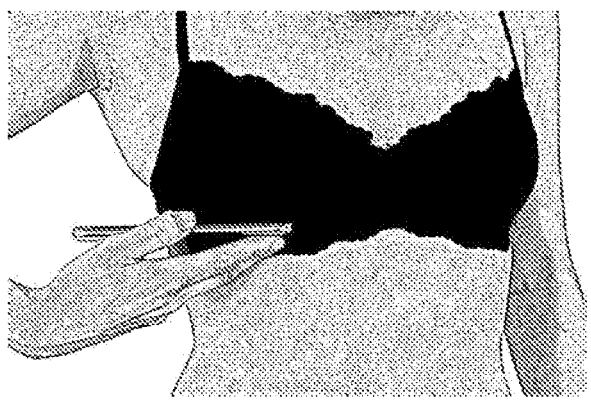
FIG. 6 is an environmental front view of the cellphone or other portable multimedia device with a GUI of FIG. 5 being positioned by a woman under her breast so that the +X dimension of the breast may be observed by the woman.
Figure 7:
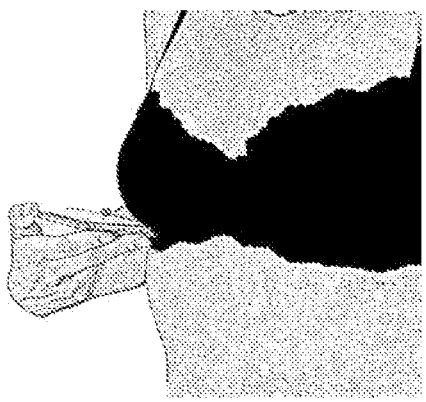
FIG. 7 is an environmental side view of the cellphone or other portable multimedia device with a GUI of FIG. 5 being positioned by a woman under her breast so that the +X dimension of the breast may be observed by the woman.

FIG. 5 is an image of a cellphone or other portable multimedia device with a GUI displaying a chart for measuring the +X dimension of a woman's breast. In one embodiment, the GUI is stored in a database and delivered to the device for presentation of the display after the +X dimension has been stored in the database. The app can be a third party app or presented via a web browser. FIG. 6 is an environmental front view of the cellphone or other portable multimedia device with a GUI of FIG. 5 being positioned by a woman under her breast so that the +X dimension of the breast may be observed by the woman. As shown, the interface features a centerline 101 that is aligned by the user with the centerline of the breast so that the phone extends in a +X dimension. Suitably, the woman views her breasts over the device and observes the dimension, which is defined by the graduation or the area between the graduations to which the breast extends over the chart. FIG. 7 is an environmental side view of the cellphone or other portable multimedia device with a GUI of FIG. 5 being positioned by a woman under her breast so that the +X dimension of the breast may be observed by the woman. Once the +X dimension is observed, a prompt on the display of the device may receive an input of the dimension. Suitably, the computer hardware and/or software of the device can store the dimension in a database or other similar computer component under the direction of software so that the dimension may be later recalled for inclusion in an algorithm for determining a breast cup size based on +X, −X, and +Z dimensions.

Figure 8:
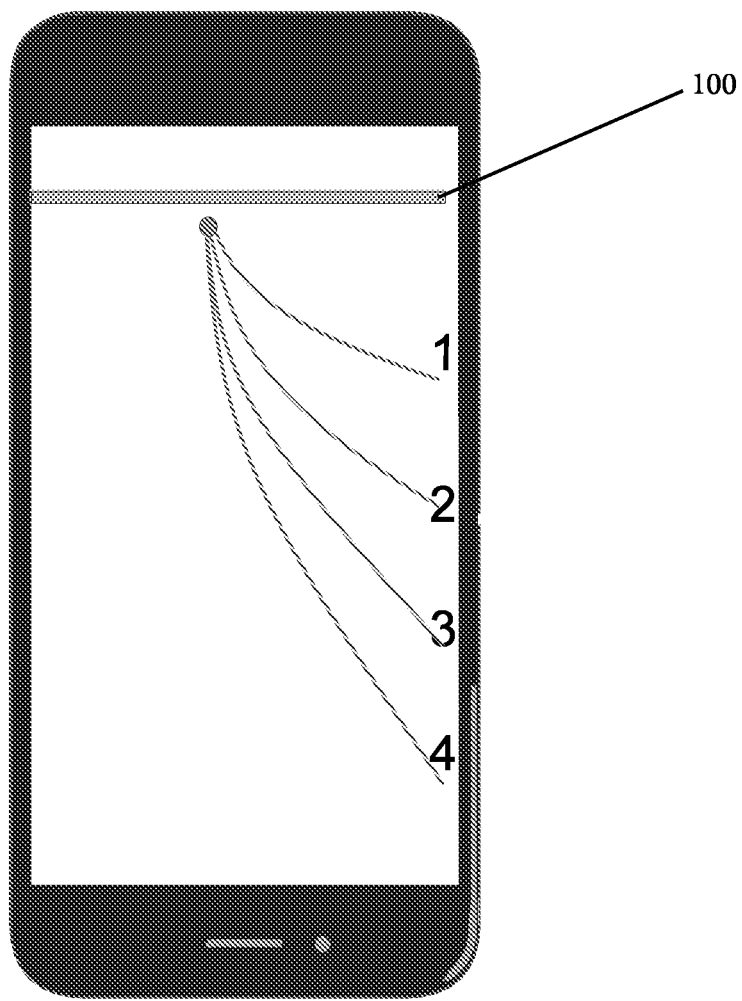
FIG. 8 is an image of a cellphone or other portable multimedia device with a GUI displaying a chart for measuring the −X dimension of a woman's breast.
Figure 9:
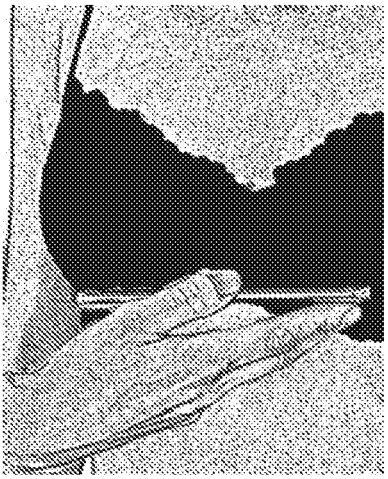
FIG. 9 is an environmental front view of the cellphone or other portable multimedia device with a GUI of FIG. 8 being positioned by a woman under her breast so that the −X dimension of the breast may be observed by the woman.
Figure 10:
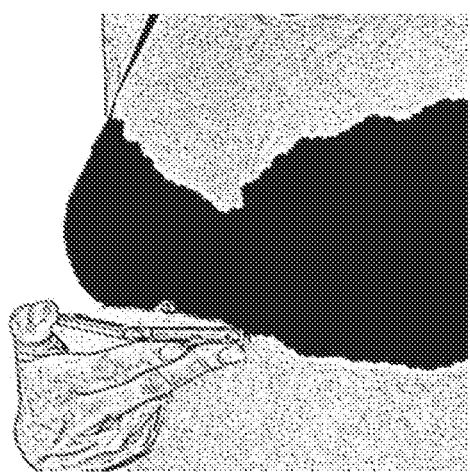
FIG. 10 is an environmental side view of the cellphone or other portable multimedia device with a GUI of FIG. 8 being positioned by a woman under her breast so that the +X dimension of the breast may be observed by the woman.

FIG. 8 is an image of a cellphone or other portable multimedia device with a GUI displaying a chart for measuring the −X dimension of a woman's breast. In one embodiment, the GUI is stored in a database and delivered to the device for presentation of the display after the +X dimension has been stored in the database. The app can be a third party app or a web browser. FIG. 9 is an environmental front view of the cellphone or other portable multimedia device with a GUI of FIG. 8 being positioned by a woman under her breast so that the −X dimension of the breast may be observed by the woman. As shown, the interface features a centerline 100 that is aligned by the user with the centerline of the breast so that the phone extends in the −X dimension. Suitably, the woman views her breasts over the device and observes the dimension, which is defined by the graduation to which the breast extends over the phone. FIG. 10 is an environmental side view of the cellphone or other portable multimedia device with a GUI of FIG. 8 being positioned by a woman under her breast so that the +X dimension of the breast may be observed by the woman. Once the −X dimension is observed, a prompt on the display of the device may receive an input of the dimension. Suitably, the computer hardware of the device can store the dimension in a database or other similar computer component under the direction of software so that the dimension may be later recalled for inclusion in an algorithm for determining a breast cup size based on +X, −X, and +Z dimensions.

Figure 11:
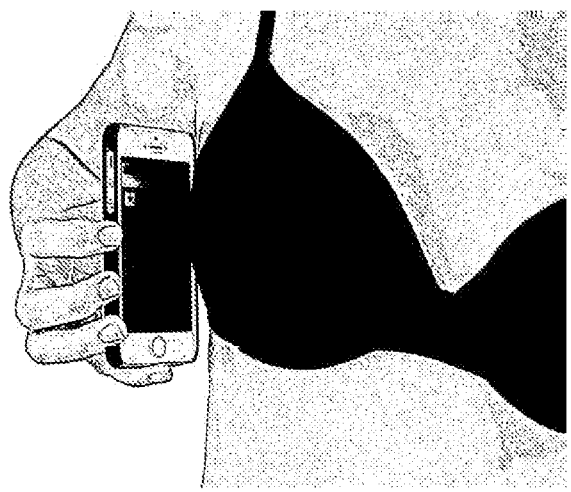
FIG. 11 is an environmental front view of the cellphone or other portable multimedia device with a GUI of FIG. 5 or FIG. 8 being positioned by a woman to the side of her breast so that the −Y dimension of the breast may be observed by the woman.
Figure 12:
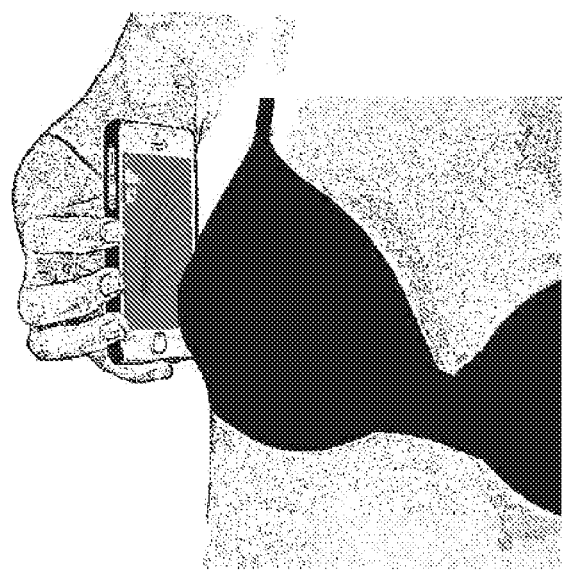
FIG. 12 is an environmental side view of the cellphone or other portable multimedia device with a GUI of FIG. 5 or FIG. 8 being positioned by a woman to the side of her breast so that the +Y dimension of the breast may be observed by the woman.
Figure 13:
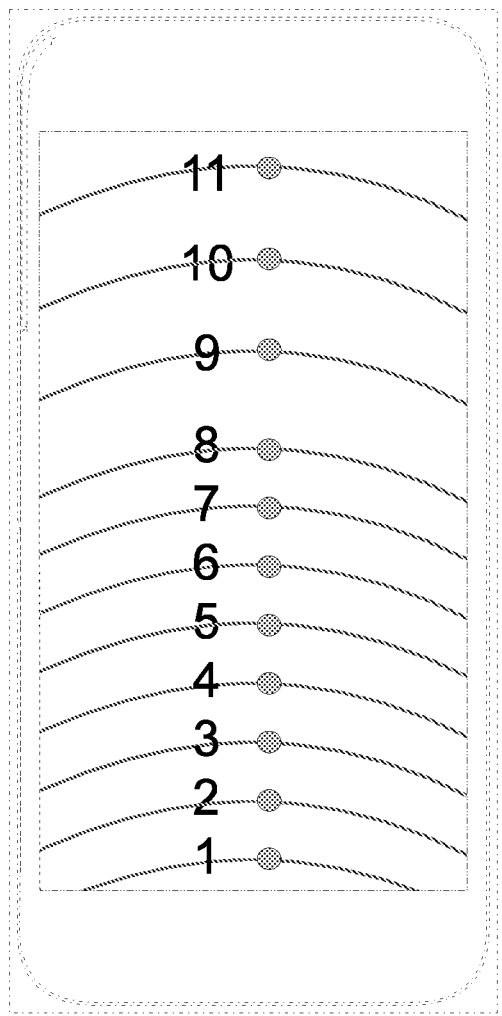
FIG. 13 is an image of a GUI displaying a chart for measuring the +Z dimension of a woman's breast.
Figure 14:
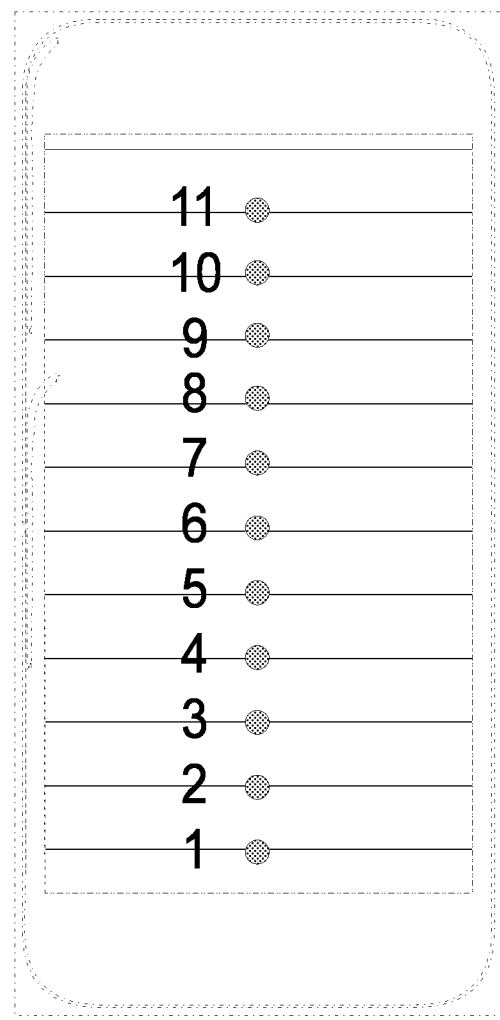
FIG. 14 is an image of a GUI displaying a chart for measuring the +Z dimension of a woman's breast.
Figure 15:
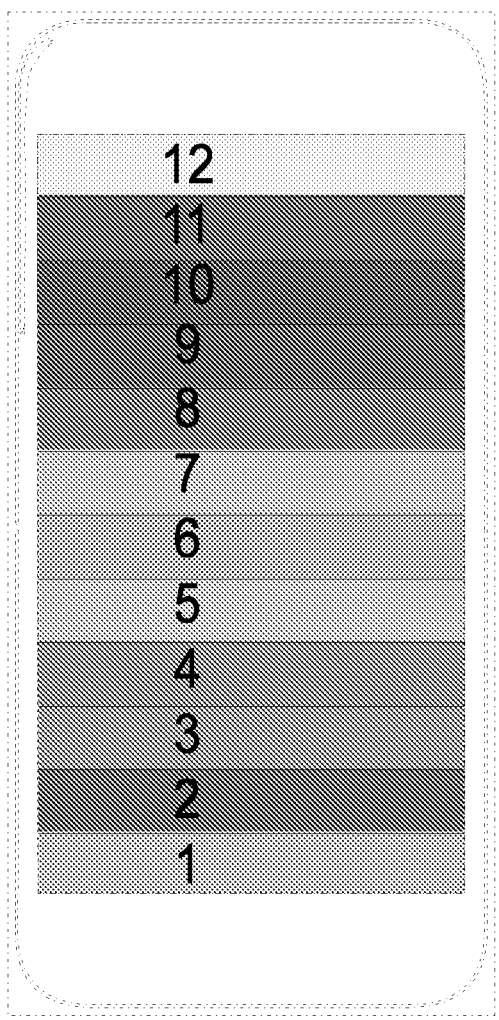
FIG. 15 is an image of a GUI displaying a chart for measuring the +Z dimension of a woman's breast.
Figure 16:
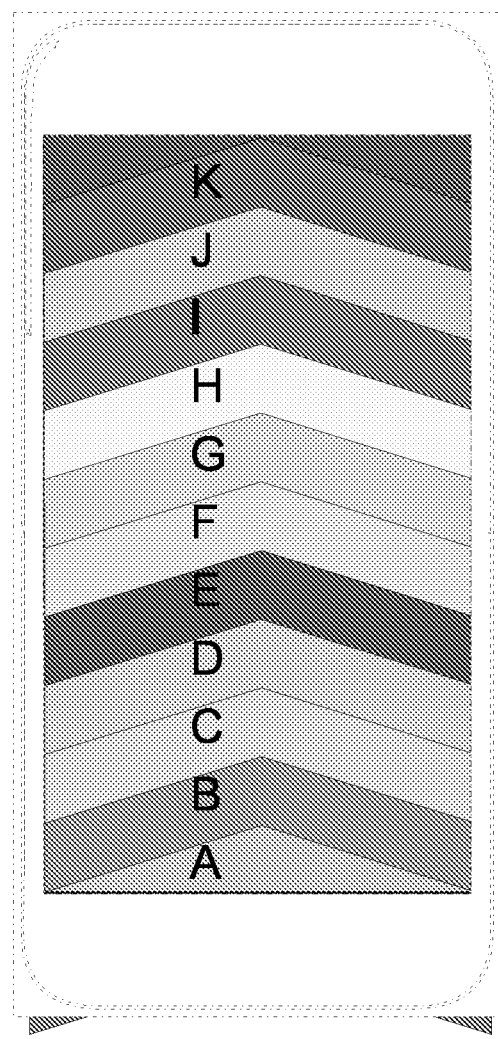
FIG. 16 is an image of a GUI displaying a chart for measuring the +Z dimension of a woman's breast.
Figure 17:
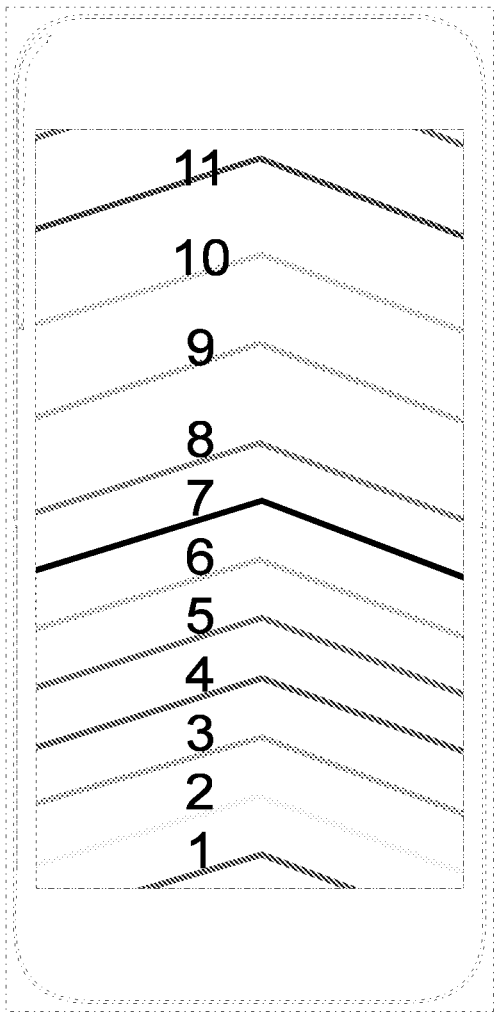
FIG. 17 is an image of a GUI displaying a chart for measuring the +Z dimension of a woman's breast.
Figure 18:
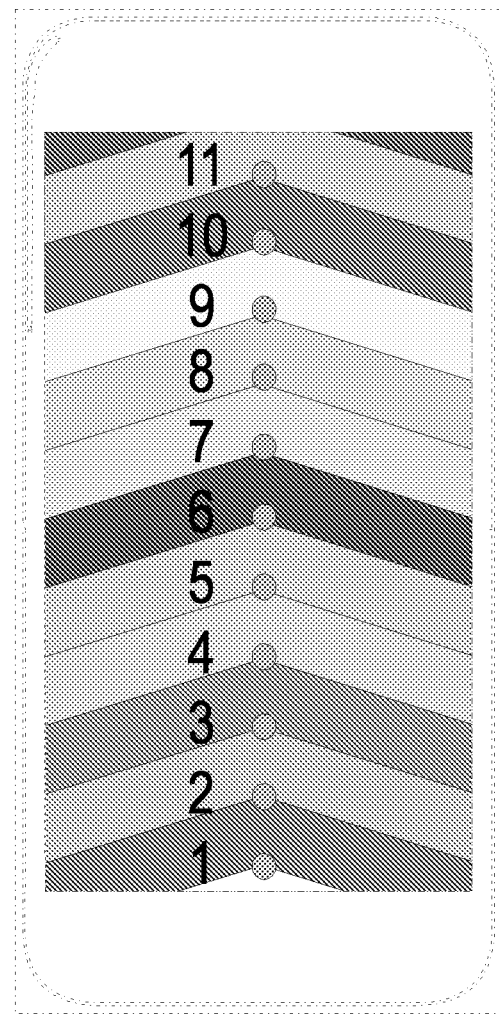
FIG. 18 is an image of a GUI displaying a chart for measuring the +Z dimension of a woman's breast.

FIG. 11 is an environmental front view of the cellphone or other portable multimedia device with a GUI of FIG. 5 or FIG. 8 being positioned by a woman to the side of her breast so that the −Y dimension of the breast may be observed by the woman. FIG. 12 is an environmental side view of the cellphone or other portable multimedia device with a GUI of FIG. 5 or FIG. 8 being positioned by a woman to the side of her breast so that the +Y dimension of the breast may be observed by the woman. Suitably, the +Y and −Y can be included in the calculation of the breast cup size as provided above.

Figure 19:
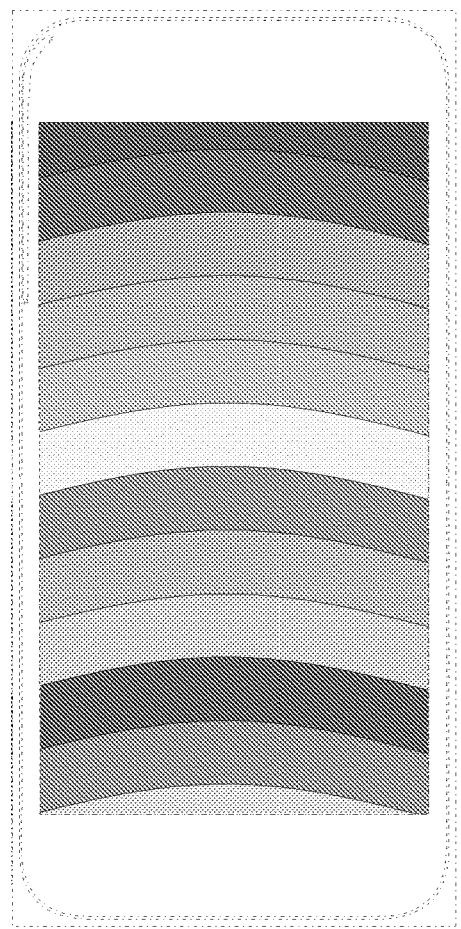
FIG. 19 is an image of a GUI displaying a chart for measuring the +Z dimension of a woman's breast.
Figure 20:
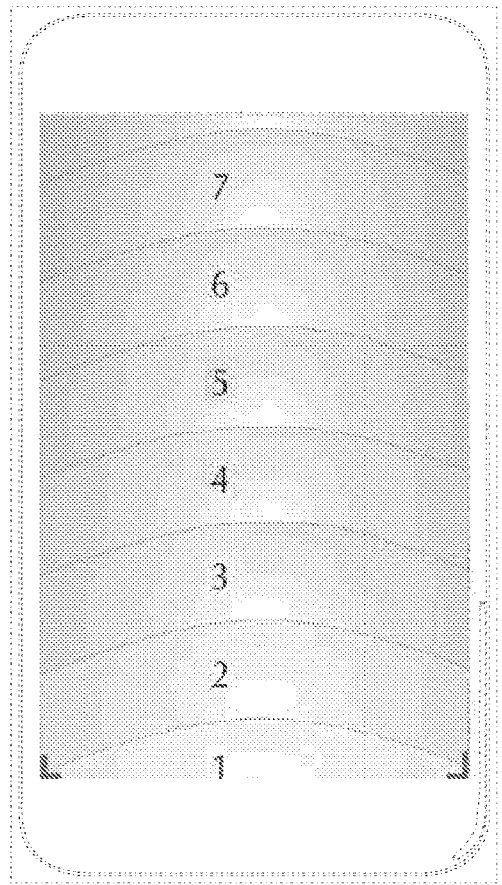
FIG. 20 is an image of a GUI displaying a chart for measuring the +Z dimension of a woman's breast.
Figure 21:
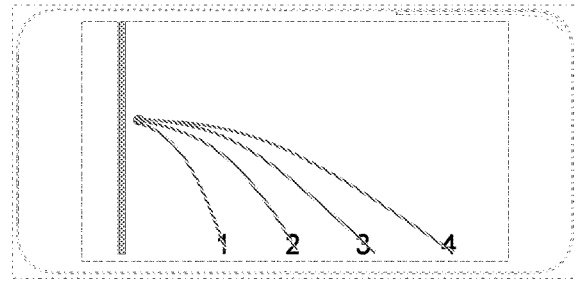
FIG. 21 is an image of a GUI displaying a chart for measuring the +X, −X, +Y or −Y dimensions of a woman's breast.
Figure 26:
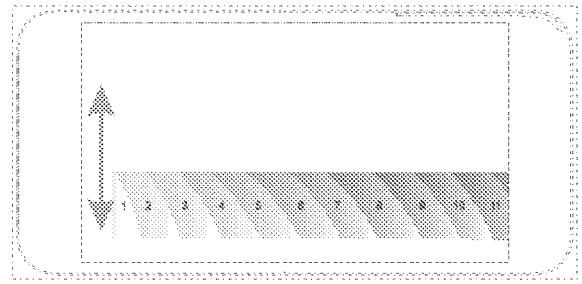
FIG. 26 is an image of a GUI displaying a chart for measuring the +X, −X, +Y or −Y dimensions of a woman's breast.
Figure 22:
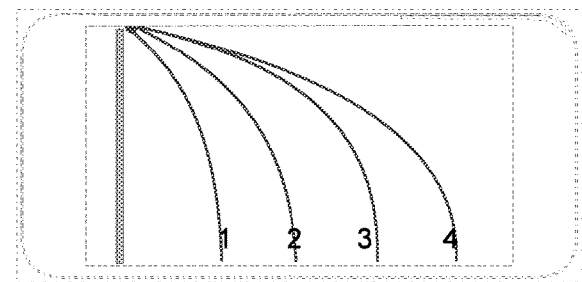
FIG. 22 is an image of a GUI displaying a chart for measuring the +X, −X, +Y or −Y dimensions of a woman's breast.
Figure 25:
FIG. 25 is an image of a GUI displaying a chart for measuring the +X, −X, +Y or −Y dimensions of a woman's breast.
Figure 23:
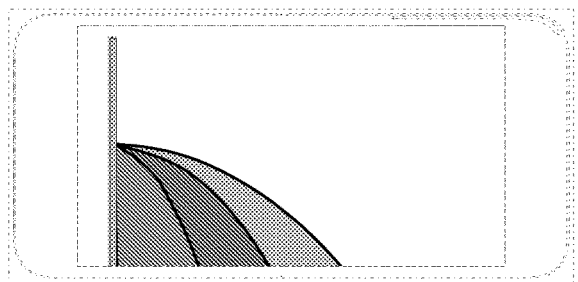
FIG. 23 is an image of a GUI displaying a chart for measuring the +X, −X, +Y or −Y dimensions of a woman's breast.
Figure 24:
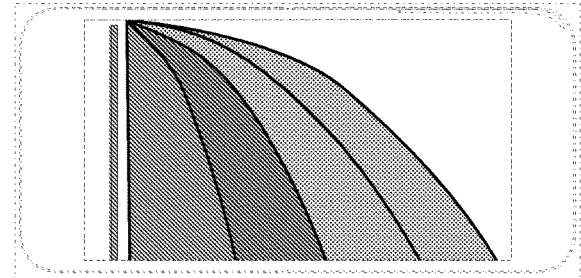
FIG. 24 is an image of a GUI displaying a chart for measuring the +X, −X, +Y or −Y dimensions of a woman's breast.
Figure 27:
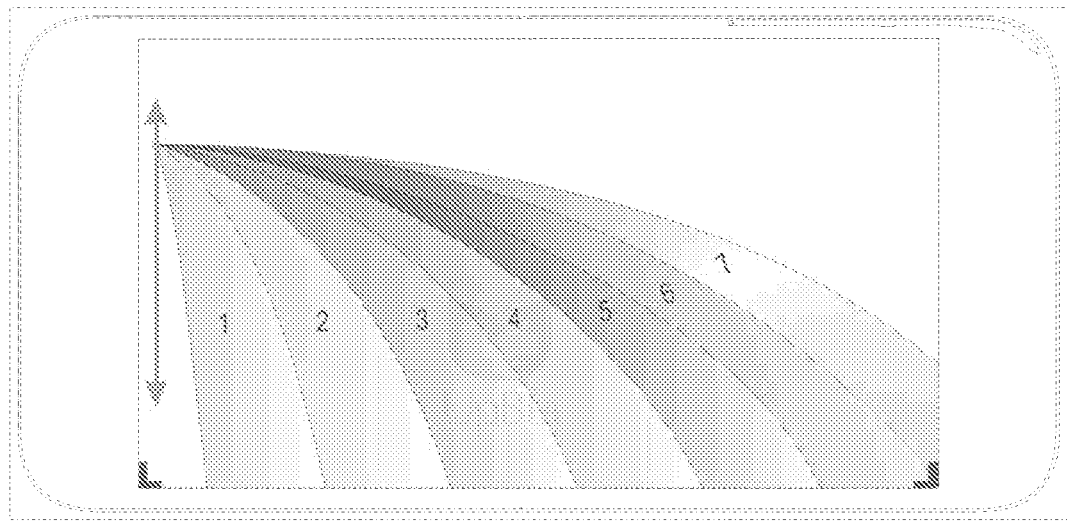
FIG. 27 is an image of a GUI displaying a chart for measuring the +X, −X, +Y or −Y dimensions of a woman's breast.
Figure 28:
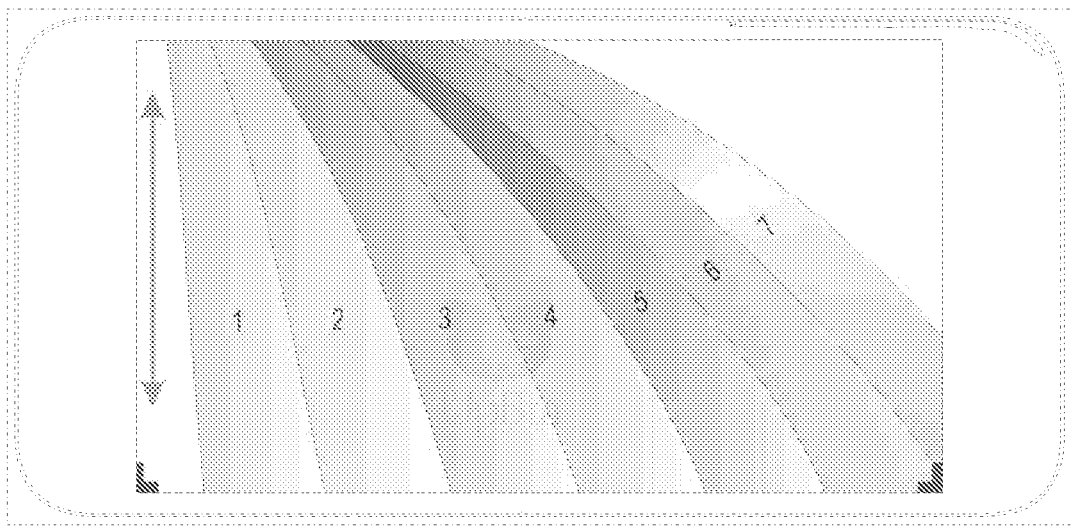
FIG. 28 is an image of a GUI displaying a chart for measuring the +X, −X, +Y or −Y dimensions of a woman's breast.
Figure 29:
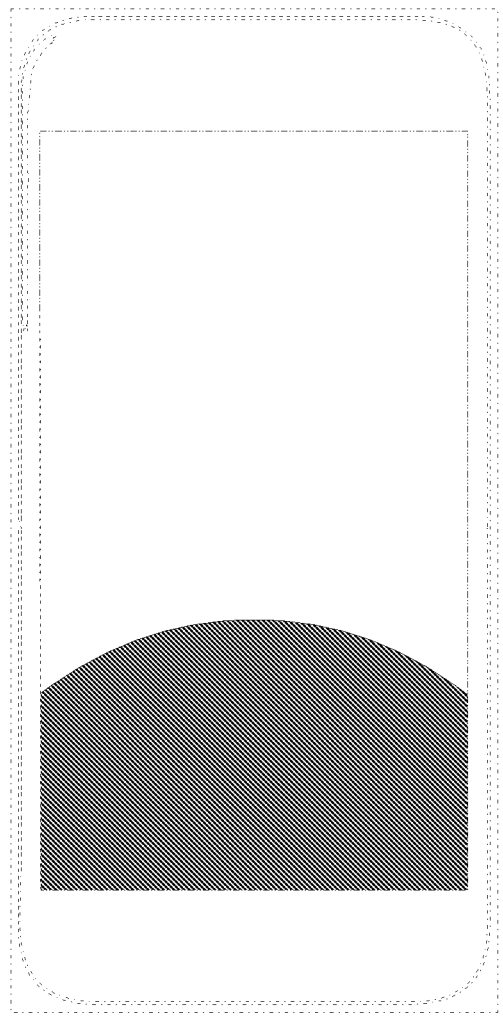
FIG. 29 is an image of a GUI displaying a chart for measuring the +Z dimension of a woman's breast.
Figure 30:
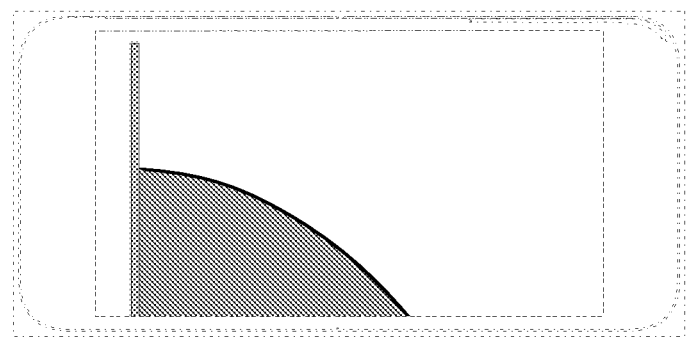
FIG. 30 is an image of a GUI displaying a chart for measuring the +X, −X, +Y or −Y dimensions of a woman's breast; and, FIG. 31 is an image of a GUI displaying a chart for measuring the +X dimension of a woman's breast.
Figure 31:
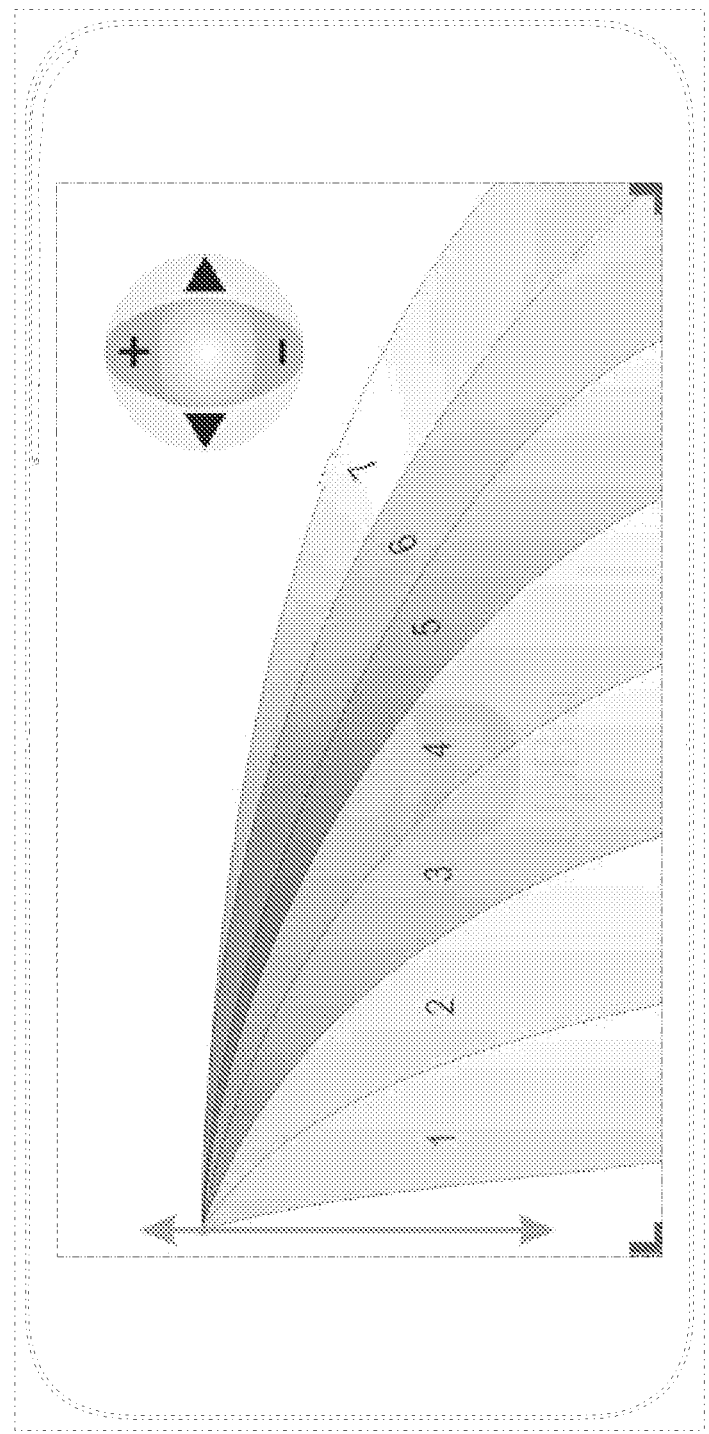

FIGS. 13 through 20 are images of GUIs displaying alternate embodiments of charts for measuring the +Z dimension of a woman's breast as described above. FIG. 21 through 31 are images of GUIs displaying a chart for measuring the +X, −X, +Y or −Y dimensions of a woman's breast. FIG. 29 is an image of a GUI displaying a chart for measuring the +Z dimension of a woman's breast where the graduation can be controlled by a user and slid via movement of the finger over the GUI to a proper dimension that corresponds to the breast. FIG. 31 is an image of a GUI displaying a chart for measuring the +X, −X, +Y or −Y dimensions of a woman's breast where the graduation can be controlled by a user and slid via movement of the finger over the GUI to a proper dimension that corresponds to the breast. FIG. 19 or 20 is an image of a GUI displaying a chart for measuring the +Z dimension of a woman's breast where the chart can be positioned on the display of the cell phone via command arrows so that the breast aligns with the applicable dimensions.

Figure 51:
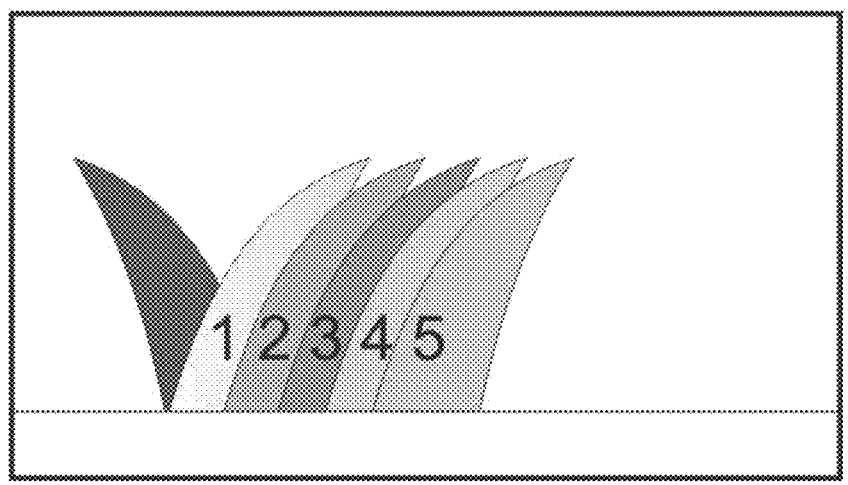
FIG. 51 is front perspective view of GUI displaying a chart for measuring the X dimension of a woman's breast from between the breasts of a user.
Figure 52:
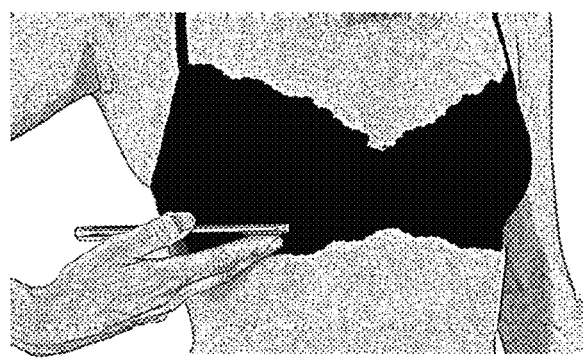
FIG. 52 is an environmental front view of the cellphone or other portable multimedia device with a GUI of FIG. 51 being positioned by a woman under her breast so that the a dimension of the breast may be observed by the woman, where the dimension is the distance between her two breasts.
Figure 53:
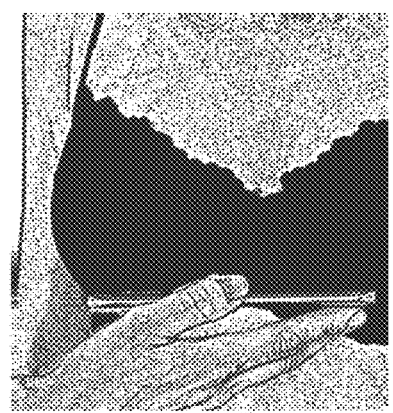
FIG. 53 is front perspective view of GUI displaying a chart for measuring the X dimension of a woman's breast from between the breasts of a user.
Figure 54:
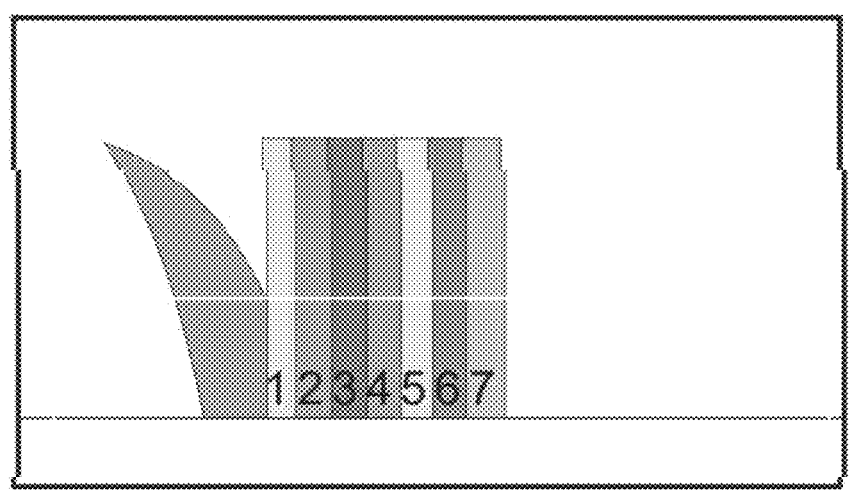
FIG. 54 is an environmental front view of the cellphone or other portable multimedia device with a GUI of FIG.
Figure 55:
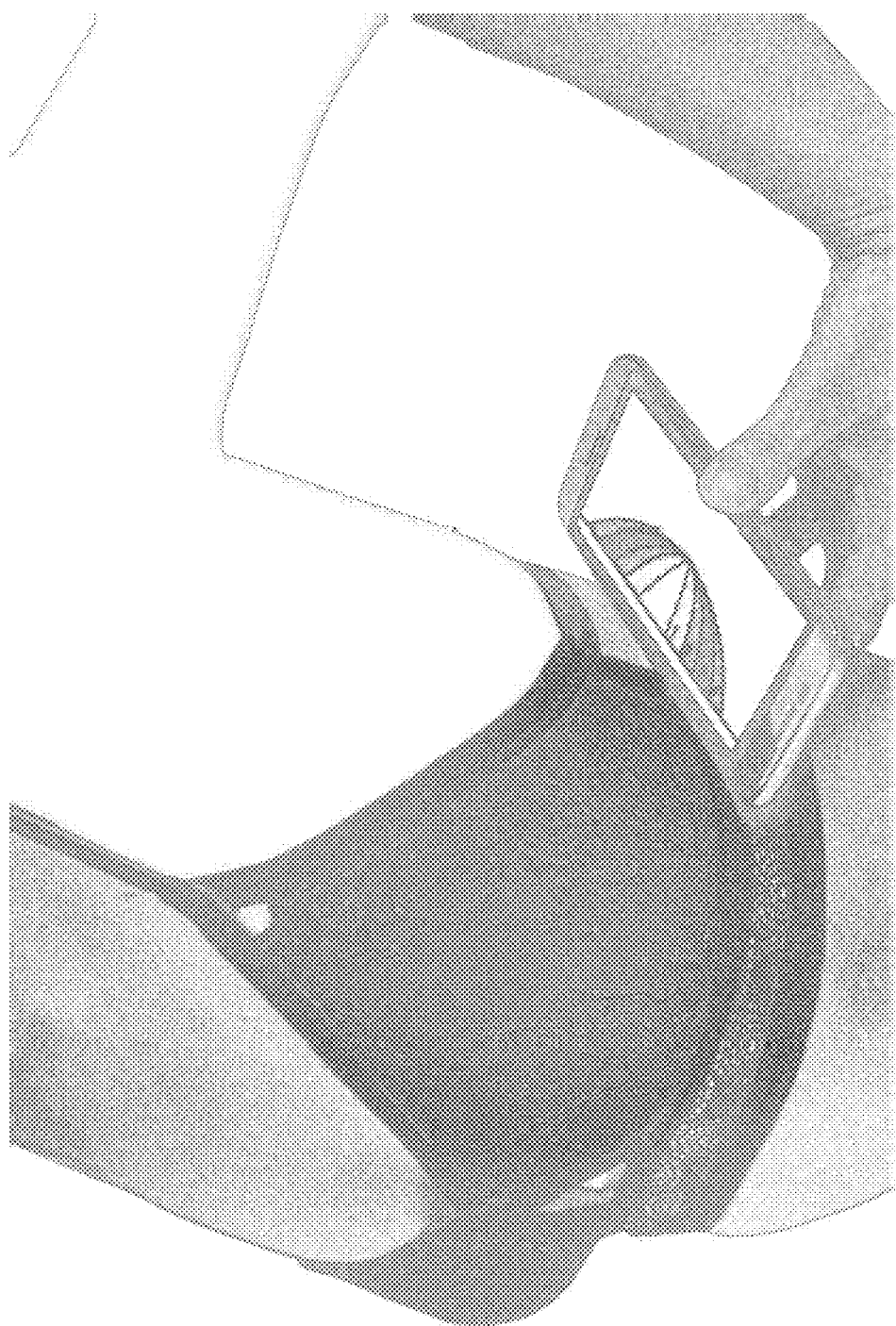

A woman may use various GUIs to measure other dimensions associated with the breast or torso. For instance, FIG. 51 is front perspective view of GUI displaying a chart for measuring the X dimension of a woman's breast from between the breasts of a user. FIG. FIG. 52 is an environmental front view of the cellphone or other portable multimedia device with a GUI of FIG. FIG. 51 being positioned by a woman under her breast so that a dimension of the breast may be observed by the woman, where the dimension is the distance between her two breasts. In another embodiment, FIG. 53 is front perspective view of GUI displaying a chart for measuring the X dimension of a woman's breast from between the breasts of a user. In that embodiment, FIG. 54 is an environmental front view of the cellphone or other portable multimedia device with a GUI of FIG. FIG. 53 being positioned by a woman under her breast so that the a dimension of the breast may be observed by the woman, where the dimension is the distance between the side of her rib cage and the side of her breast. Finally, FIG. 55 is an environmental front view of the cellphone or other portable multimedia device with a GUI being positioned by a woman against her side so that the a dimension of the torso may be observed by the woman, where the dimension is the distance between the front edge of the side of her rib cage and the front edge of the side of her rib cage.

Figure 32:
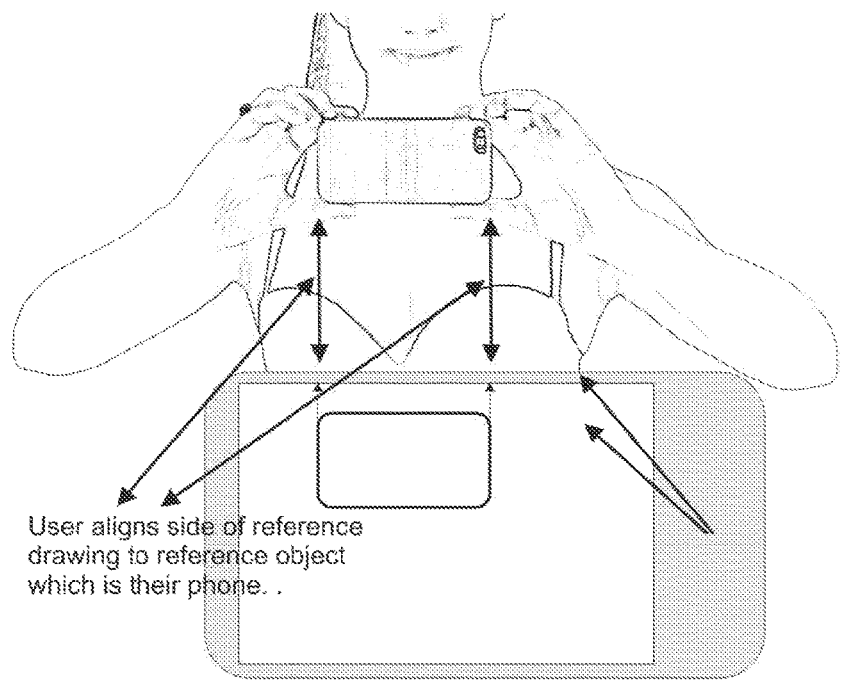
FIG. 32 is a schematic of a breast cup and torso measuring device for use with a front facing mirror.
Figure 33:
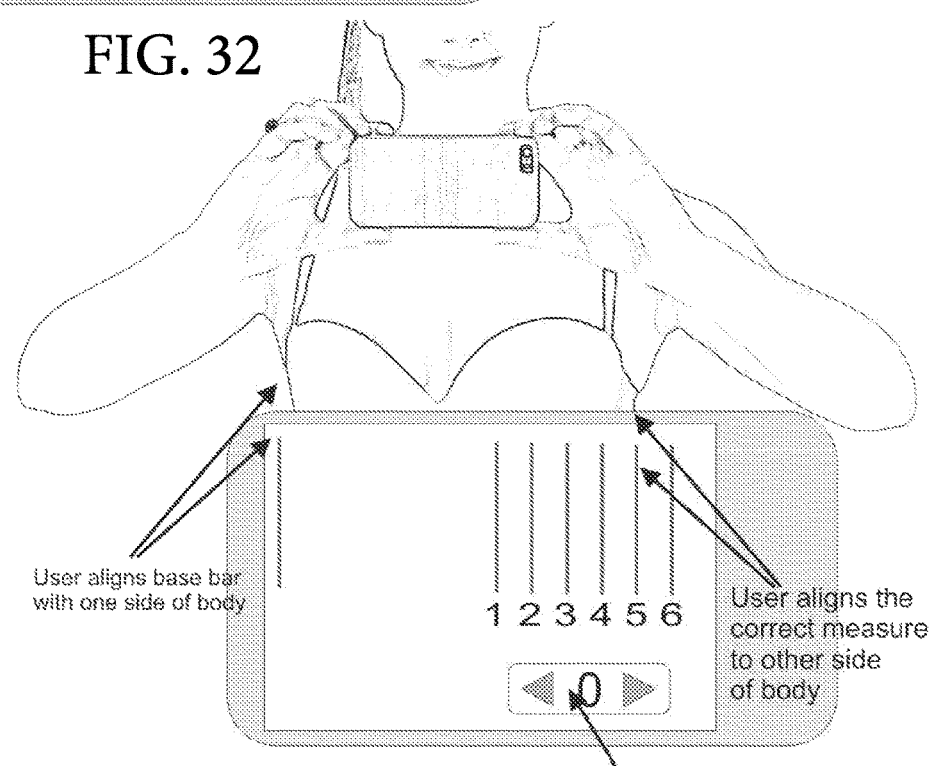
FIG. 33 is a second schematic of a breast cup and torso measuring device for use with a front facing mirror.
Figure 34:
FIG. 34 is an image of a user operating a breast cup and torso measuring device while facing a front facing mirror.

FIG. 32 is a schematic of a breast cup and torso measuring device for use with a front facing mirror. FIG. 33 is a second schematic of a breast cup and torso measuring device for use with a front facing mirror. FIG. 34 is an image of a user operating a breast cup and torso measuring device while facing a front facing mirror. As shown, the breast cup and torso measuring device may be a smart phone or other smart mobile device with a back facing camera (or any other live view or other view finder) and a front facing display for presenting a real-time camera feed from the back facing camera. It should be noted that, as discussed below in connection with FIGS. 35 through 44, even though this embodiment is disclosed in connection with a back facing camera, the methods and inventions disclosed herein can be accomplished with or without a device that includes a camera. In a preferred embodiment, the phone features software for super imposing a reference box, a scale for measuring the torso of a user, and an origin of the scale over to top of the real-time camera feed on the display. Suitably, a front facing mirror may be provided as shown in FIG. 34. In one embodiment, device (e.g., phone) may be pointed at the front facing mirror so that the rear facing camera captures a live feed of the image on the mirror and presents the same on the front facing display. Suitably, the live feed will depict the back face of the device and the user's torso behind the device on the front facing display of the device. In a preferred embodiment, the user may orient the device and position his or her self in front of the mirror until the back face of the device is fit within the reference box and the origin of the scale is aligned with a side of the user's torso and another side of the user's torsos is aligned with a reading off the scale. Ultimately, the reading on the scale may be recorded to determine the torso size of the wearer.

Suitably, a method of obtaining a torso measurement can be accomplished in four steps: (1) a user faces a mirror with a breast cup and torso measuring device; (2) the user directs the device toward the mirror and aligns the back face of the device with the reference box superimposed on the live feed of the display; (3) the user manipulates his or her position in the mirror until a user's side is aligned with the origin of the scale that is superimposed on the live feed of the display; and (4) a user reads the measure on the scale that is super imposed on the live feed of the display and aligned with the other side of the user.

In another embodiment, the device employs two reference points to adjust the scale for measuring the torso: 1) the origin of the scale in the app's screen 2) the width of your device (phone). Using those two reference measurements, the device can programmatically determine the distance knows the reflected distance between the reference points. In other words, a user looks at his or herself yourself in the mirror, lines up the torso in the scale on the device's screen and selects where the torso lines up on the measure. Based on the user's input, the app will translate the "zone" where you line up into a measurement of the width of the front plane of his or her body. In a preferred embodiment, the ratio is 10-to-7 to determine the circumference of the user's body relative to the width of the user's body. In other embodiments, the disclosed method can be used to also determine the depth, as opposed to the width, of a torso. Suitably, using a measure of depth and width of the torso could be used in improve accuracy of the bra band size determination.

Figure 35:
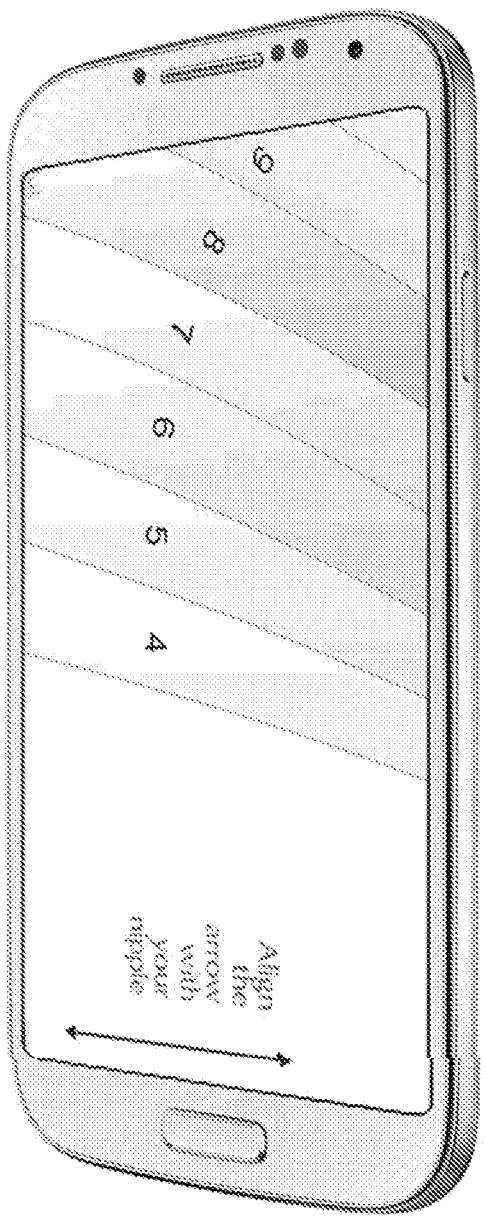
FIG. 35 is front perspective view of a cellphone or other portable multimedia device with a GUI displaying a chart for measuring an X dimension of a woman's breast.
Figure 36:
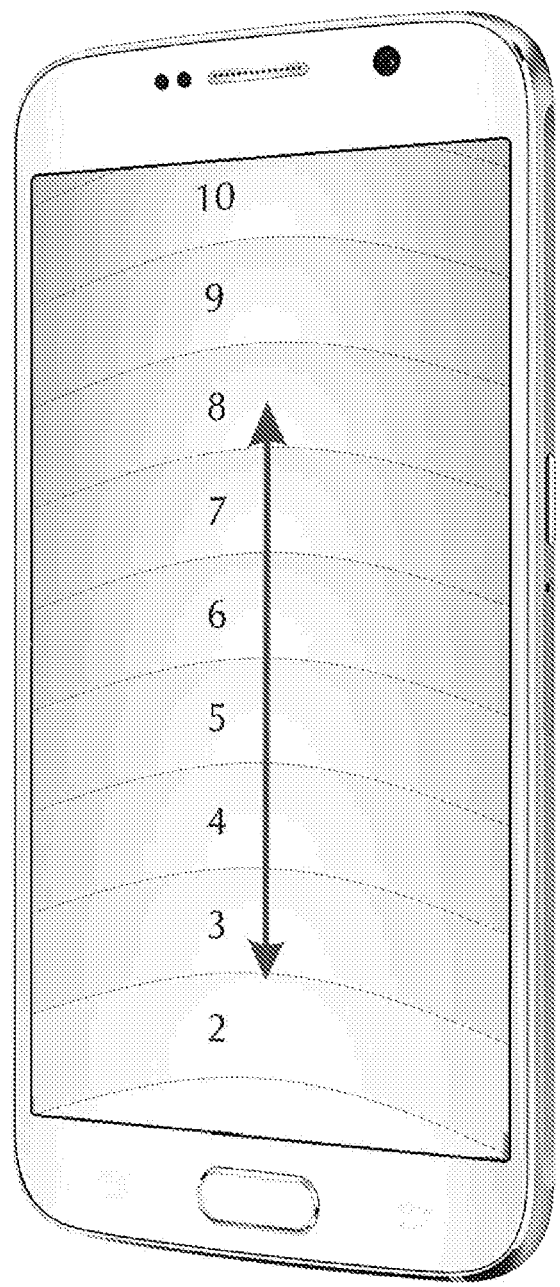
FIG. 36 is a front perspective view of a cellphone or other portable multimedia device with a GUI displaying a chart for measuring the +Z dimension of a woman's breast.

In yet another embodiment, a breast cup and torso measuring device may be combined to determine the size of a breast in the + or −X direction, the + or −Y direction, + or −Z direction, and the band length of a torso. FIG. 35 is front perspective view of a cellphone or other portable multimedia device with a GUI displaying a chart for measuring the + or −X dimension of a woman's breast. A user may pull up the GUI shown in FIG. 35 on the display of the device to determine the + or −Y direction in the manner disclosed above for both breasts. FIG. 36 is a front perspective view of a cellphone or other portable multimedia device with a GUI displaying a chart for measuring the + or −Z dimension of a woman's breast. A user may pull up the GUI shown in FIG. 36 on the display of the device to determine the + or −7 direction in the manner disclosed above for both breasts.

Figure 37:
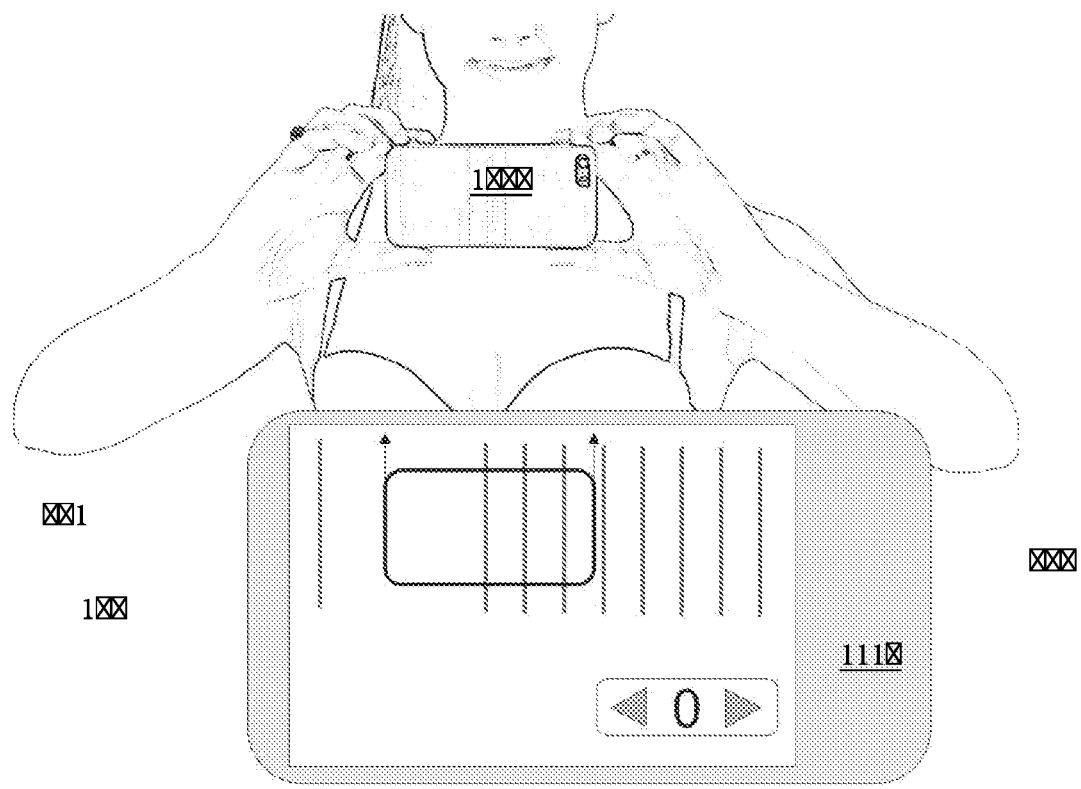
FIG. 37 is a schematic of a breast cup and torso measuring device for use with a front facing mirror.
Figure 38:
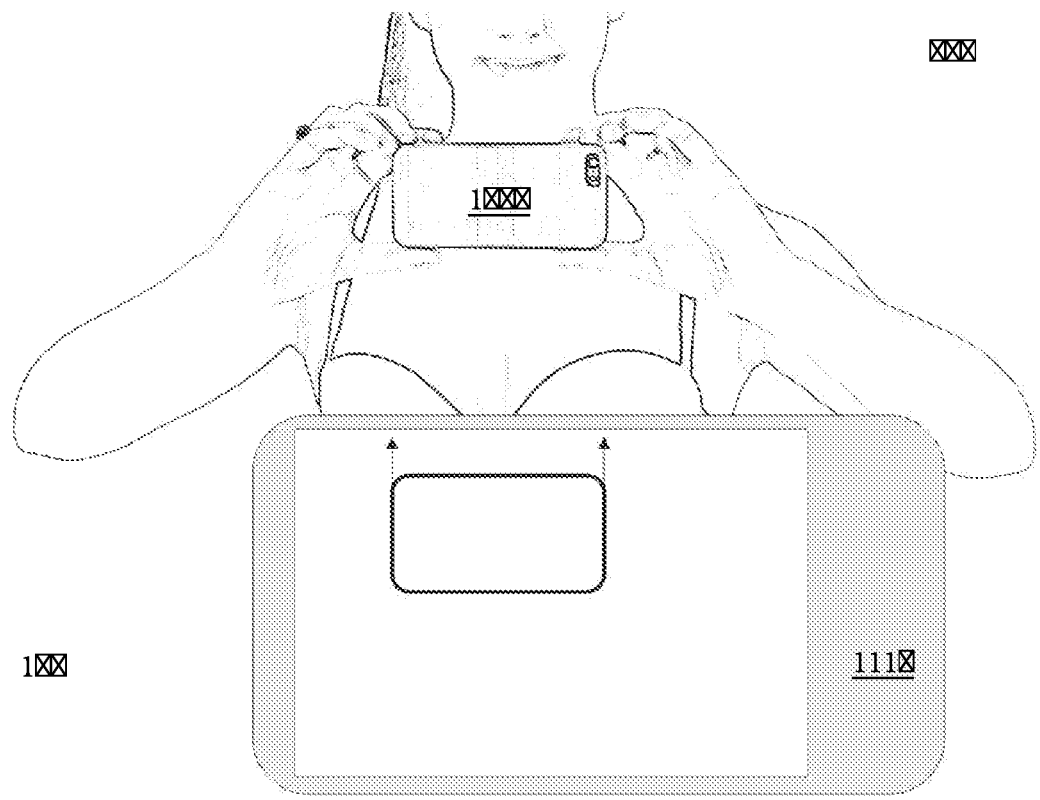
FIG. 38 is another schematic of a breast cup and torso measuring device for use with a front facing mirror.

FIG. 37 is a schematic of a breast cup and torso measuring device 1000 for use with a front facing mirror. FIG. 38 illustrate schematics of a breast cup and torso measuring device 1000 for use with a front facing mirror. In the embodiment, a GUI may be presented that features a reference box 100, a scale 200 with an origin 201, and a measure input prompt 300. Suitably, the camera and real-time feed to the front facing display is not needed in this embodiment of the disclosed subject matter, yet the user may still measure the torso. First, as shown in FIG. 37, a user may look past or over the device 1010 at the reflection of the device 1000 in the front facing mirror (not shown). Using the reflection, the user may adjust the distance between the mirror and the device 1010 until the sides of the reflected device 1000 align with the sides of the reference box 1000. Suitably, it is not necessary that the top and bottom of the reference box 100 align with the top and bottom of the reflection of the device 1000 because it is only alignment of the sides of the box 100 and reflected device 1000 that matters for determining the torso measurement. Alignment of the box 100 and reflected device 1000 is only necessary to set the distance between the device 1000 and the mirror. Once the distance between the device 1010 and mirror is set, the user may align the origin 201 of the scale 200 with one side of the torso so that the measurement of the torso as it aligns on the other side of the scale 200 may be taken and provided to the input prompt 300. Finally, the algorithm in the breast cup and torso measuring device 1000 the torso measurement dimension, or the measurement may be looked-up by the processor of the device 1000 on a chart based on the input of the prompt 300.

Figure 39:
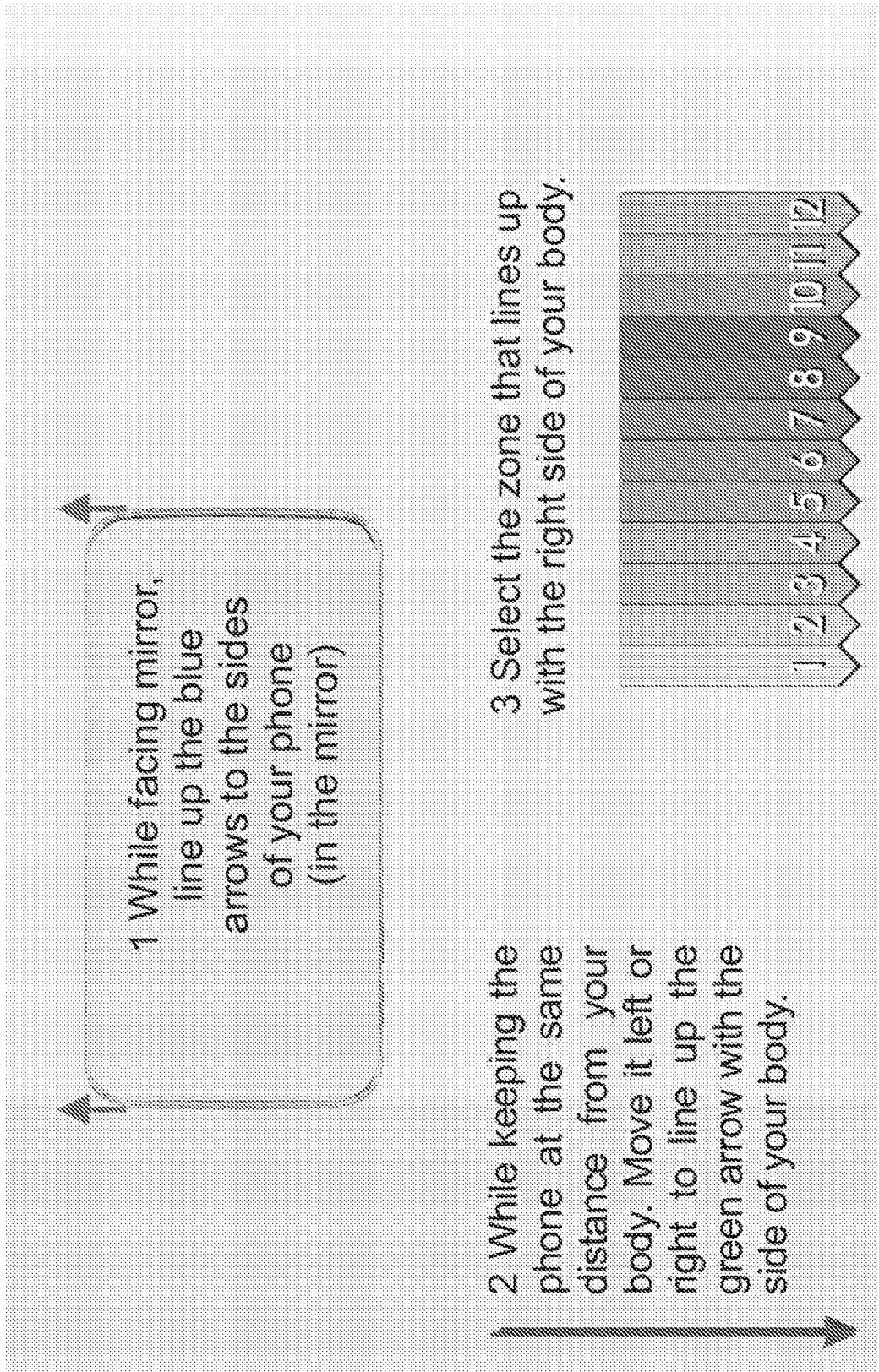
FIG. 39 is preferred GUI for use in a breast cup and torso measuring device for use with a front facing mirror.
Figure 41:
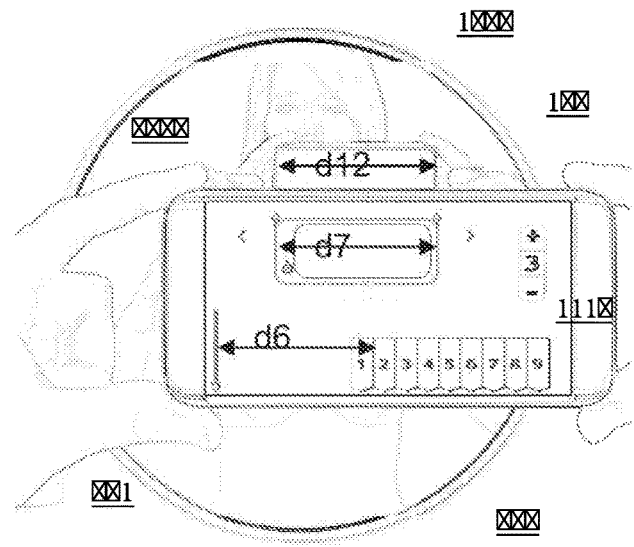
FIG. 41 is another schematic of a breast cup and torso measuring device for use with a front facing mirror.
Figure 40:
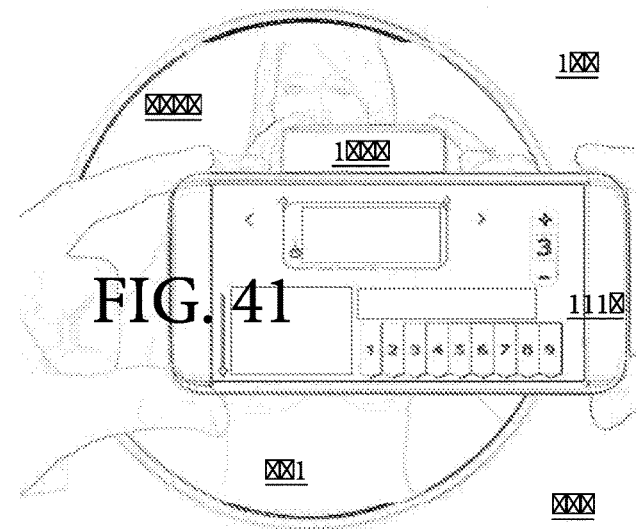
FIG. 40 is another schematic of a breast cup and torso measuring device for use with a front facing mirror.
Figure 42:
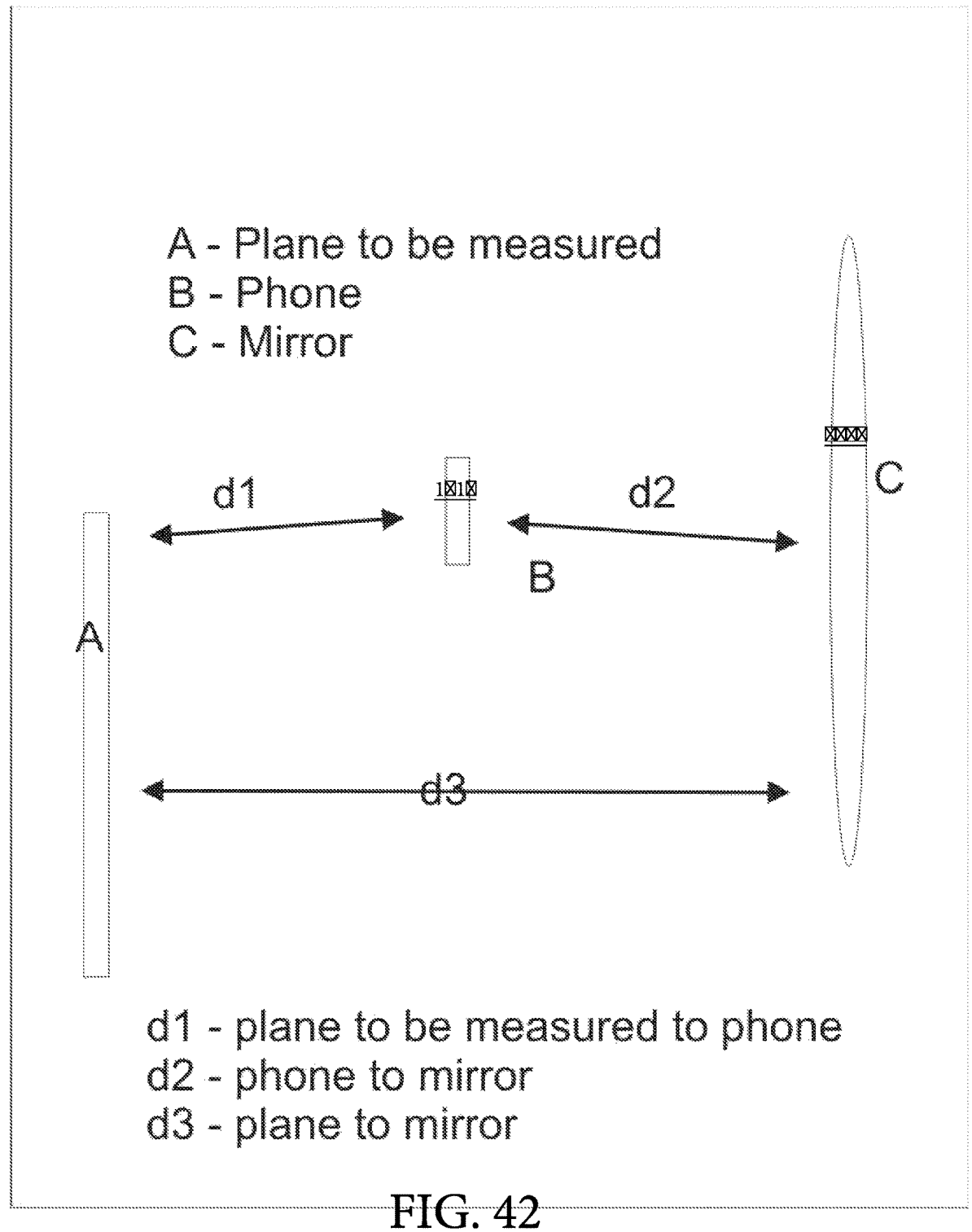
FIG. 42 is a diagram of a breast cup and torso measuring device for use with a front facing mirror.

FIG. 39 is a GUI that may be displayed on the display of a phone or simply printed to paper for measuring the torso via a front facing mirror. FIG. 40 a schematic of a breast cup and torso measuring device 1000 for use with a front facing mirror 2000. FIG. 41 illustrates a schematic of a breast cup and torso measuring device 1010 for use with a front facing mirror 2000. FIG. 42 diagrams the setup of a breast cup and torso measuring device 1010 for use with a front facing mirror 2000. In the embodiment, a GUI (FIG. 39) may be presented on the device 1110 that features a reference box 100 and a scale 200 with an origin 201. In one embodiment, the reference box is a drawing or image of a reflected device. First, as shown in FIGS. 40, 41, and 42, a user may look past or over the device 1010 at the reflection of the device 1000 in the front facing mirror 2000. Using the reflection of the device 1000, the user may adjust the distance (d2 FIG. 42) between the mirror 2000 and the device 1010. Referring to FIGS. 40 and 41, the distance (d2 FIG. 42) may be adjusted until the sides of the reflected device 1000 align with the sides of the reference box 1000 (d12 & d7 FIG. 41 alignment). Suitably, it is not necessary that the top and bottom of the reference box 100 align with the top and bottom of the reflection of the device 1000 because it is only alignment of the sides of the box 100 and reflected device 1000 that matters for determining the torso measurement (d6). Alignment of the box 100 and reflected device 1000 is only necessary to set the distance (d2, FIG. 42) between the device 1010 and the mirror 2000. Once the distance (d2, FIG. 42) between the device 1010 and mirror 2000 is set, the user may align the origin 201 of the scale 200 with one side of the torso so that the measurement of the torso (d6, FIG. 41) as it aligns on the other side of the scale 200 may be taken. Finally, the algorithm in the breast cup and torso measuring device 1000 the torso measurement dimension, or the measurement may be looked-up by the processor of the device 1000 on a chart based on the input of the prompt 300.

Figure 43:
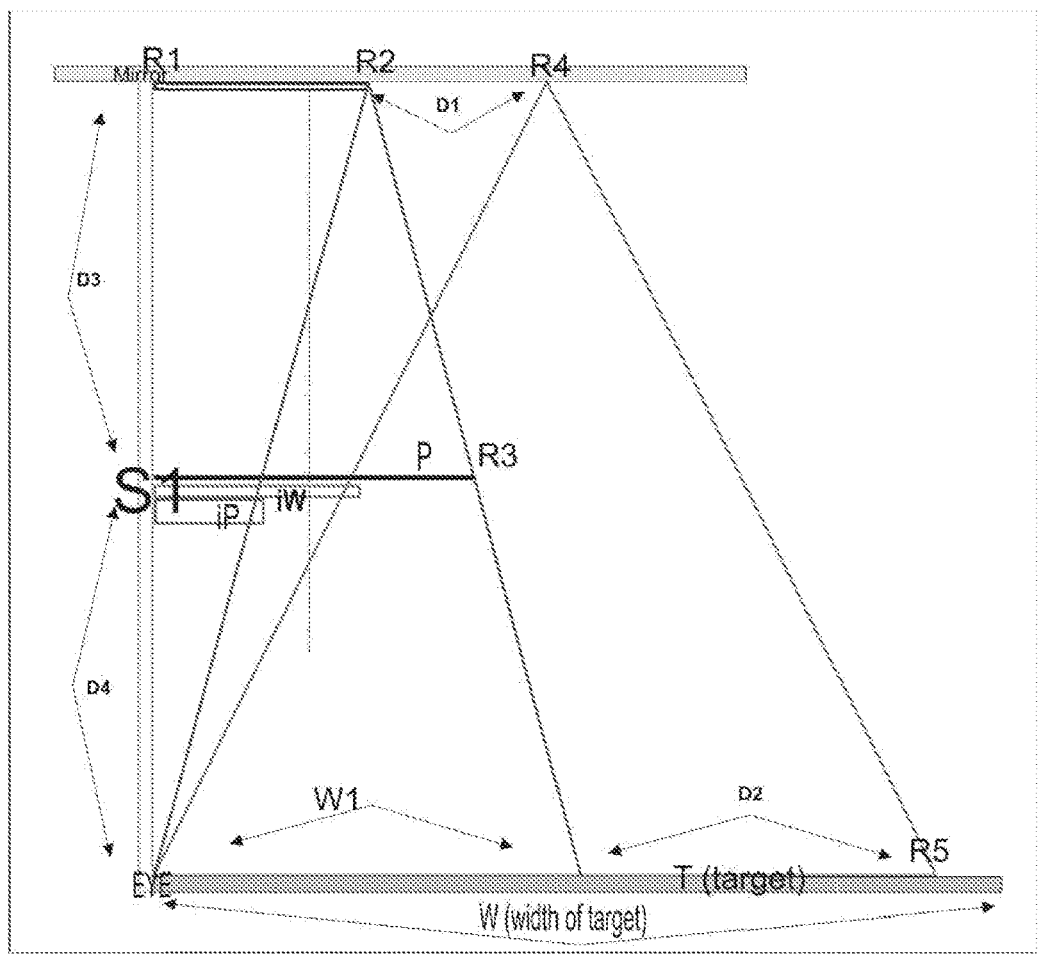
FIG. 43 is a diagram of a breast cup and torso measuring calculations for use with a front facing mirror.
Figure 44:
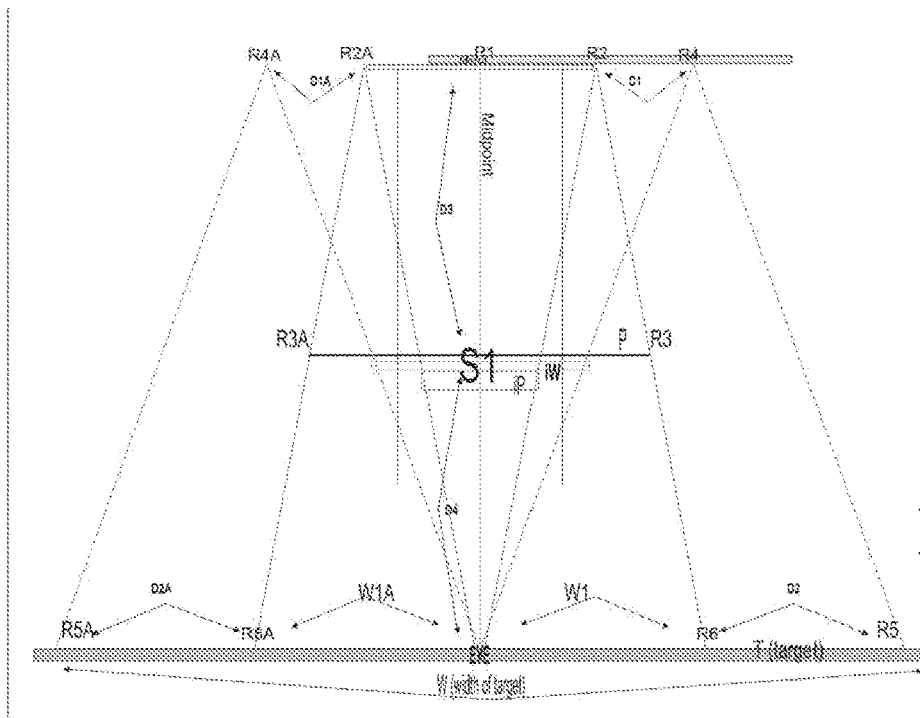
FIG. 44 is a diagram of a breast cup and torso measuring calculations for use with a front facing mirror.

FIGS. 43 and 44 are a more generalized description of the setup and diagram of a breast cup and torso measuring device for use with a front facing mirror. Suitably, the figure can be interpreted to show the setup for use of the breast measuring device but may also be interpreted in general to show the setup for to determining the width (W) of any object. It should be noted that this configuration and embodiment represents just one of infinite alignment possibilities (i.e., a non-limiting embodiment). As shown, the phone or breast cup and torso measuring device (P) and its display have fixed dimensions and therefor represents fixed values. Suitably, the reference object or reference box (iP) and a scale (iW) that are presented on a GUI of the phone (P) may also be constructed in fixed dimensions and to represent fixed values. The setup preferably includes a mirror (Mirror) as set forth above. The reflection of the phone (P) is illustrated as a square between reference points (R1) and (R2). Suitably, the dimension of width (W) of a target object (T) (e.g., torso), can be obtained via the reflection of the phone (P) in the Mirror. As discussed above, the reflection of the phone (P) is aligned with the reference box or object (iP). Suitably, alignment of the reflection of the phone (P) and the reference box (iP) sets a distance (D3) between the phone (P) and Mirror. Once the distance (D3) is set, a point or origin (S1) on the scale (iW) may be aligned with the first reference point (R1), which represents one side of the reflection of the object (T). Once the origin is aligned, a second reference point (R4) may be aligned with a side of the scale so that a measurement of the width (W) of the object may be made. It should be noted that the scale (iW) may be defined by a set of markers or graduations as discussed above, wherein each marker or graduation has a known distance from the starting point or origin (S1). In a preferred embodiment, the width (W) of that object (T) can be calculated using the difference between the fixed or known width of the phone (P), the fixed or known width of the reference object (iP), the width (W) between the base point of W, which is aligned to one side of the reflected view of target T and another point of reflective alignment of the target (T). In the figure, a phone is not needed and the phone can be replaced with a printout of an appropriate GUI with a reference box and a scale. Automatic calculation of the width (W) is not necessary as the measurement can be looked-up on a table. In a preferred embodiment, the reference object (iP) is in a range of between ¼ and ½ of the width of the phone (P). As stated, reference box (iP) may be a fraction of the width of the phone (P), but for a larger object, like a printout, the fractional size of the reference box (iP) may be larger or smaller than the fractions referenced.

In another view, FIG. 43 illustrates the following. Referring to that figure, the method uses three reference objects. Two of a known fixed size (P and iP) and one with a set of selectable sizes (iW). When the method user properly lines up P and iP, this establishes two points in space (R1 and R2) at the plane of the mirror (Mirror), and also establishes a distance from the mirror (D3). When two points along the iW scale with a known distance are selected to align with the beginning (R0) and end (R5) of the span (W) to be measured, two points in space (R1 and R4) are established (R1 and R4) at the plane of the mirror. The relationship between the points in space established at the mirror (R1, R2 and R4) along with the points in space at target W (R0, R6 and R5) along with known values of iP, iW ant P allows a calculation to be made of the distance between points R0 and R5 across the target object W.

Figure 45:
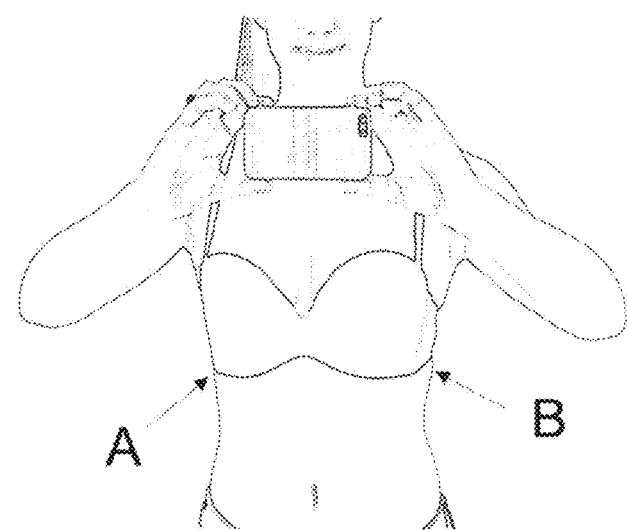
FIG. 45 is an image of a user operating a breast cup and torso measuring device while facing a front facing mirror.
Figure 46:
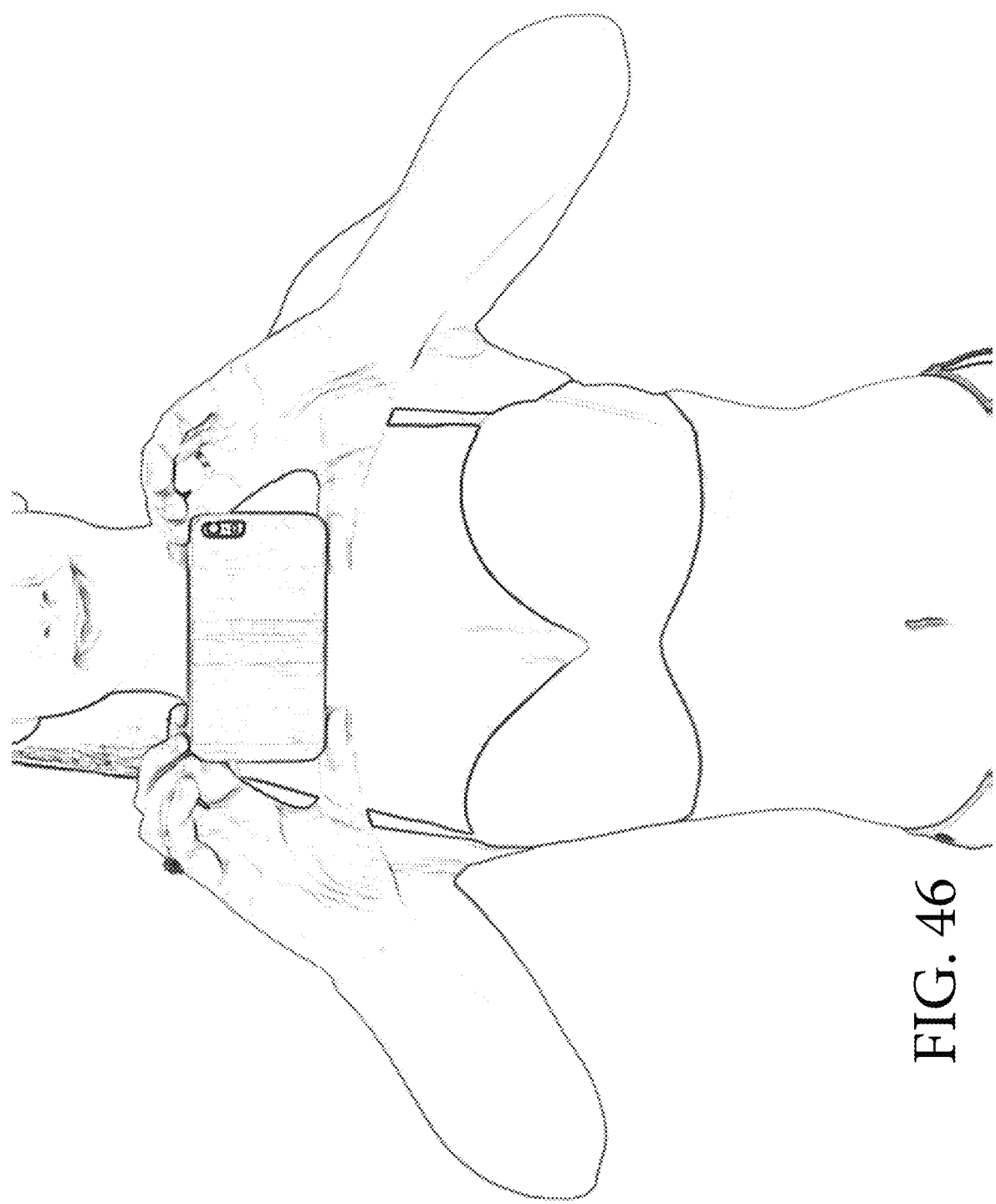
FIG. 46 is an image of a user operating a breast cup and torso measuring device while facing a front facing mirror.
Figure 47:
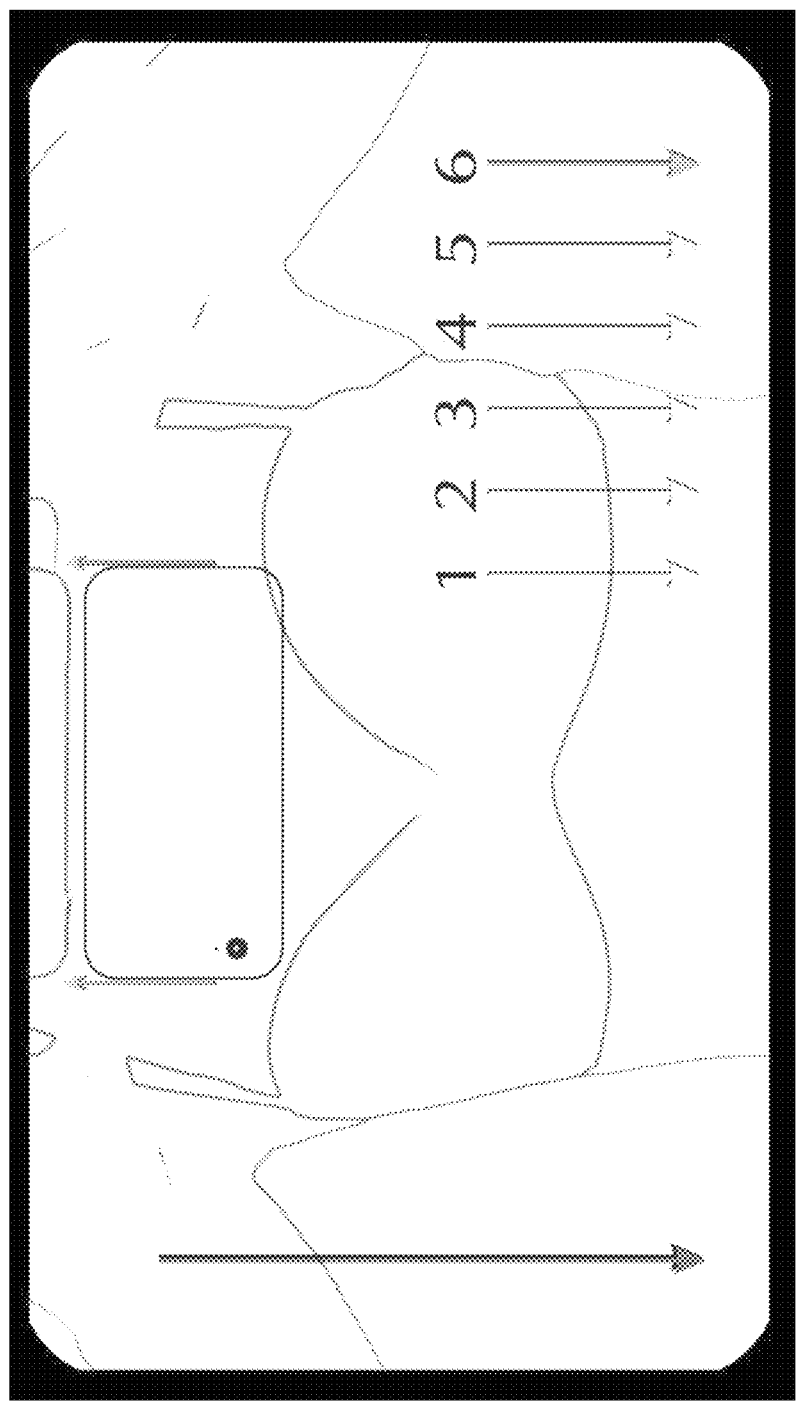
FIG. 47 is an view of the display of a electronic device when the front facing camera is directed toward a reflection in the mirror at the point of taking a picture using the front facing camera.
Figure 48:
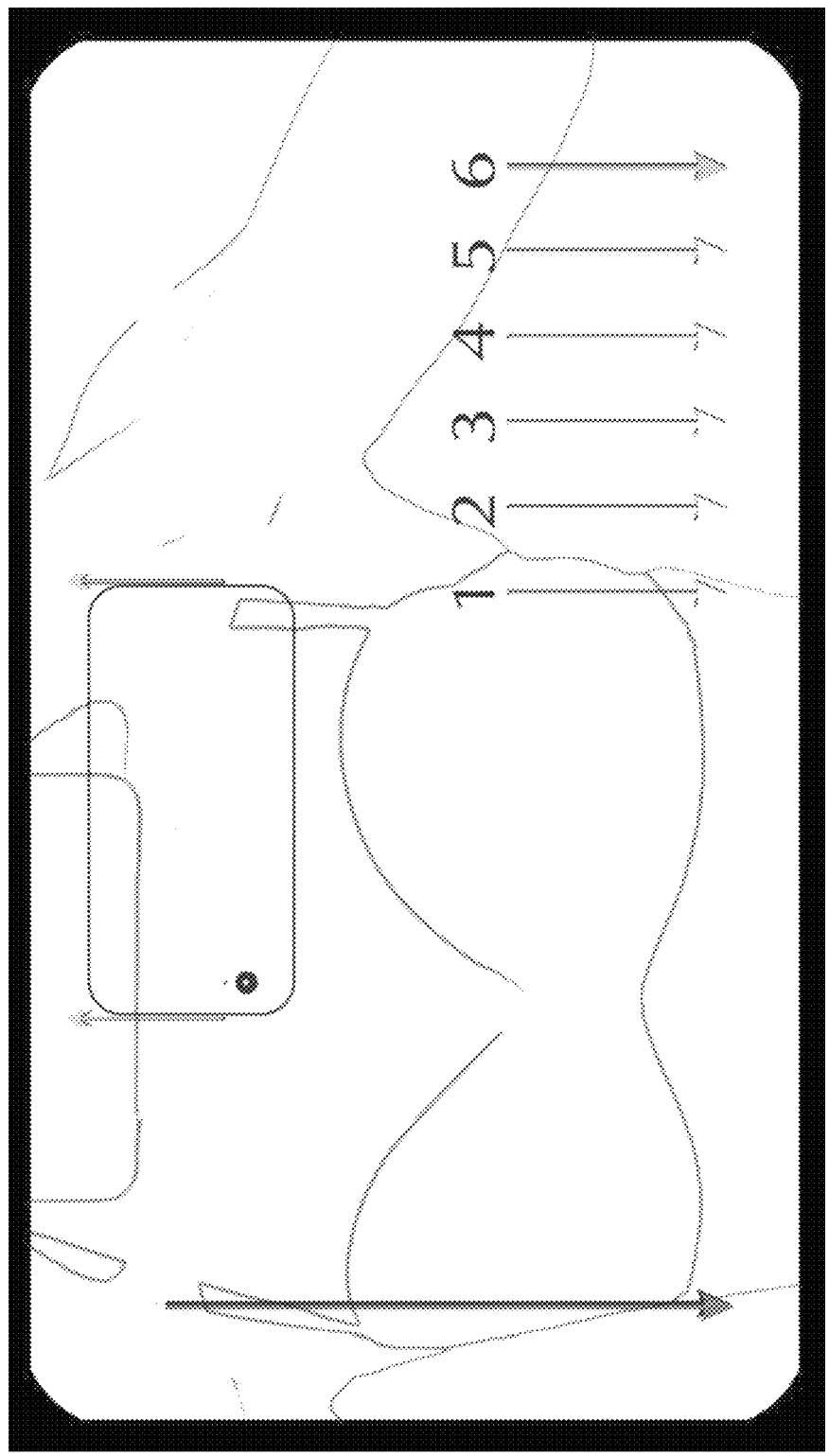
FIG. 48 is a diagram of a GUI on the display of an electronic device, wherein an image is moved over the screen beneath superimposed reference lines and/or boxes.
Figure 49:
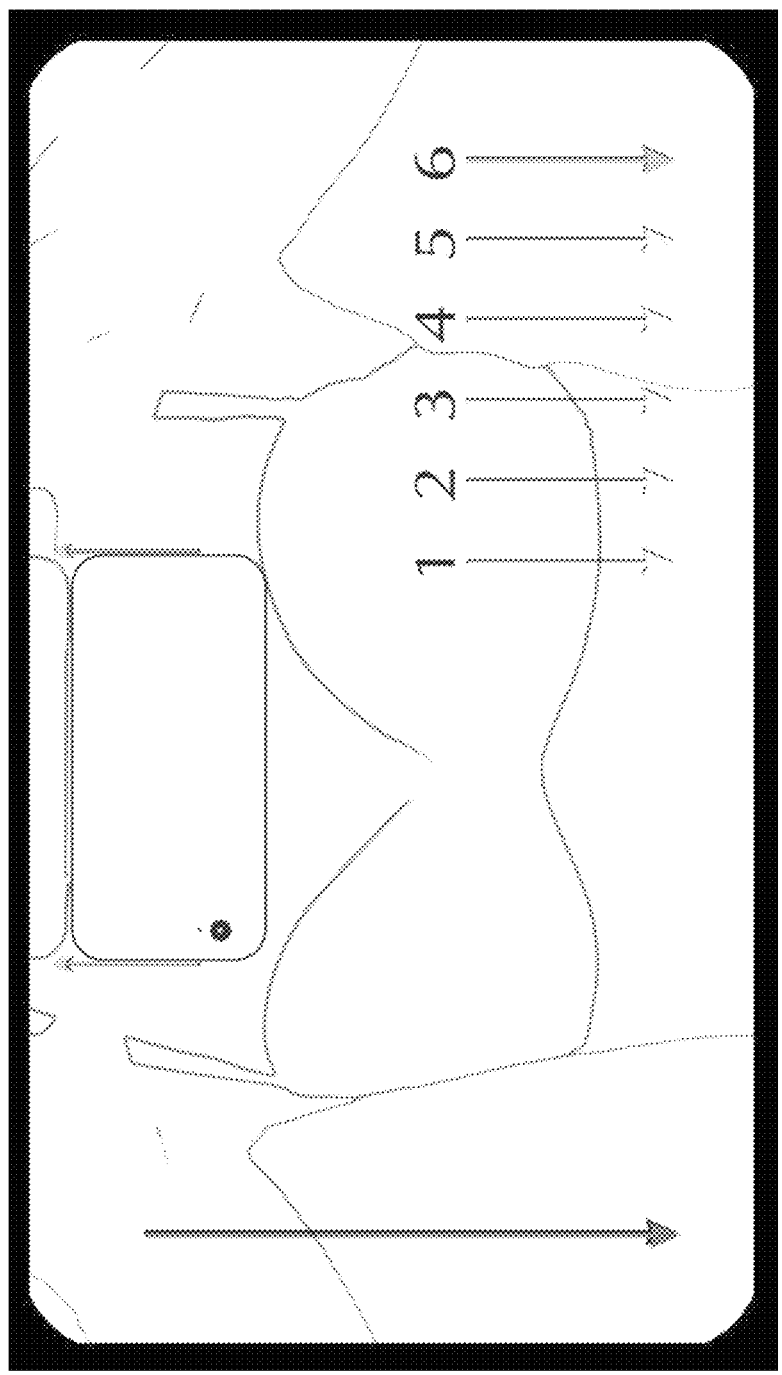
FIG. 49 is an image of a user operating a breast cup and torso measuring device while facing a front facing mirror.
Figure 50:
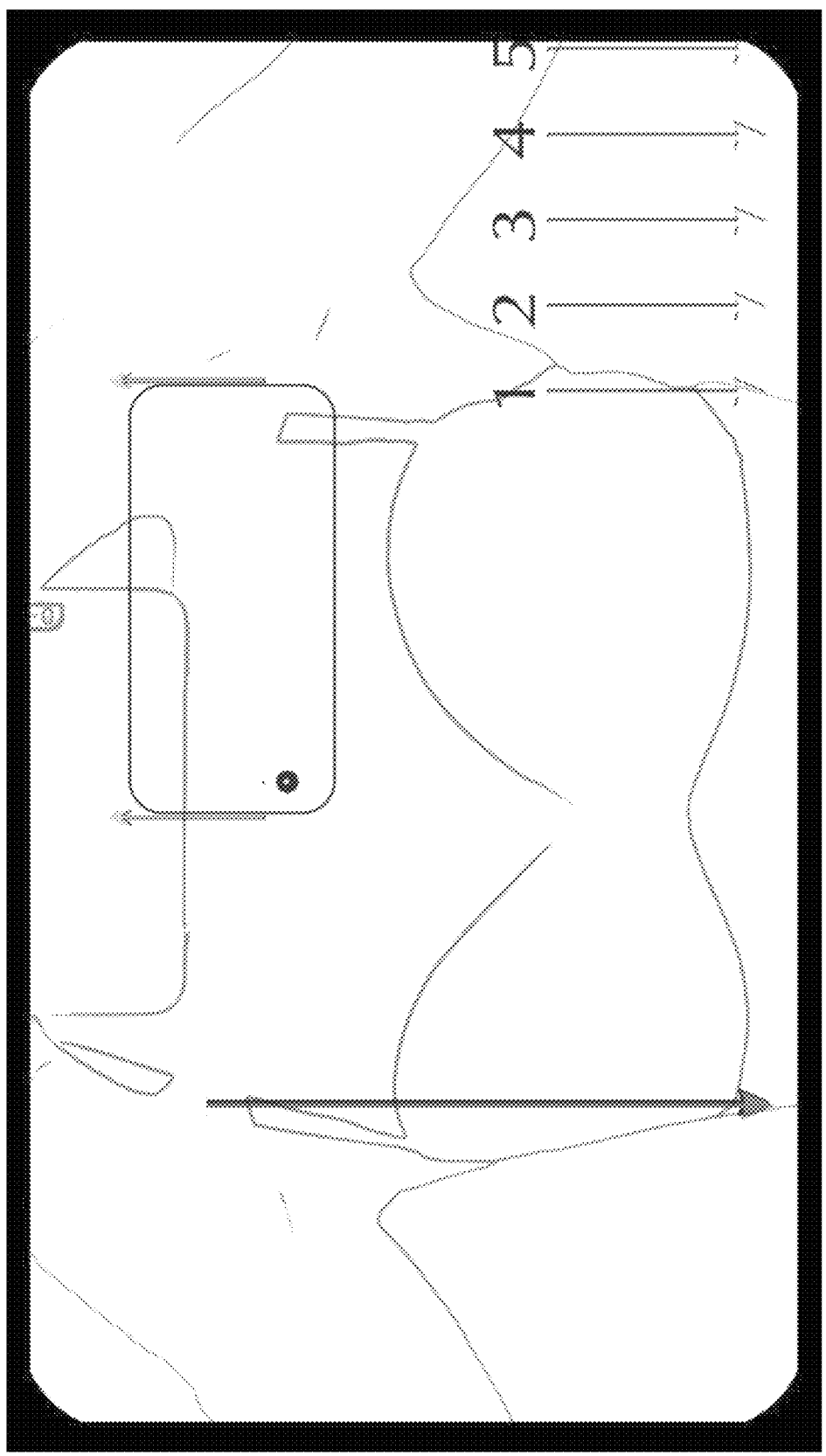
FIG. 50 is a diagram of a GUI on the display of an electronic device, wherein reference lines and/or boxes are superimposed and movable over an image.

FIGS. 46 and 45 are an image of a user operating a breast cup and torso measuring device while facing a front facing mirror. One dimension that could be measured is edge to edge exemplified by points A and B in FIG. 45. FIG. 47 is a view of the display of an electronic device when the front facing camera is directed toward a reflection in the mirror at the point of taking a picture using the front facing camera. FIG. 48 is a diagram of a GUI on the display of an electronic device, wherein an image is moved over the screen beneath superimposed reference lines and/or boxes. FIG. 49 is an image of a user operating a breast cup and torso measuring device while facing a front facing mirror. FIG. 50 is a diagram of a GUI on the display of an electronic device, wherein reference lines and/or boxes are superimposed and movable over an image.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:

1. A method of using a device
   wherein the device comprises
      a hand-held computer display coupled to computer hardware, where the hardware features software configured to
      (a) display a first chart for obtaining a first dimension of the breast in z-axis,
      (b) display an input prompt and receive thereby the first dimension,
      (c) display a second chart for obtaining a second dimension in the x axis,
      (d) display an input prompt and receive thereby the second dimension,
      (e) calculate a breast cup size correlated to the first and second dimensions, and
      (f) presenting the calculated breast cup size on the hand-held computer display; and,
   wherein a user: (1) places the hand-held computer display adjacent to a breast to observe the first dimension while the first chart is displayed; (2) inputs the first dimension into the input prompt; (3) places the hand-held computer display adjacent to a breast to observe the second dimension while the second chart is displayed; (4) inputs the second dimension into the input prompt; and, (5) observes the breast cup size on the hand-held computer display.

* * * * *